US011120538B2

(12) United States Patent
Tariq et al.

(10) Patent No.: US 11,120,538 B2
(45) Date of Patent: Sep. 14, 2021

(54) SENSOR DEGRADATION DETECTION AND REMEDIATION

(71) Applicant: Zoox, Inc., Foster City, CA (US)

(72) Inventors: Sarah Tariq, Palo Alto, CA (US); James William Vaisey Philbin, Palo Alto, CA (US); Yi Xu, Pasadena, CA (US)

(73) Assignee: Zoox, Inc., Foster City, CA (US)

( * ) Notice: Subject to any disclaimer, the term of this patent is extended or adjusted under 35 U.S.C. 154(b) by 33 days.

(21) Appl. No.: 16/728,532

(22) Filed: Dec. 27, 2019

(65) Prior Publication Data

US 2021/0201464 A1 Jul. 1, 2021

(51) Int. Cl.
*G06T 7/00* (2017.01)
*G05D 1/02* (2020.01)
(Continued)

(52) U.S. Cl.
CPC ......... *G06T 7/0002* (2013.01); *G05D 1/0246* (2013.01); *B60S 1/56* (2013.01); *B60W 50/0205* (2013.01); *B60W 50/029* (2013.01); *B60W 2050/0215* (2013.01); *B60W 2420/42* (2013.01); *G05D 2201/0213* (2013.01); *G06T 2207/20076* (2013.01); *G06T 2207/20081* (2013.01);
(Continued)

(58) Field of Classification Search
CPC ......... G06T 7/0002; G06T 2207/20081; G06T 2207/30252; G06T 2207/20076; G06T 2207/30168; G05D 2201/0213; G05D 1/0246; B60W 50/029; B60W 50/0205; B60W 2420/42; B60W 2050/0215; B60S 1/56

USPC .......................................................... 382/104
See application file for complete search history.

(56) References Cited

U.S. PATENT DOCUMENTS 6,366,164 B1 * 4/2002 Hanselmann ...... G06K 19/0723
329/347
9,972,054 B1 5/2018 Konrardy et al.
(Continued)

OTHER PUBLICATIONS

He, et al., "Single Image Haze Removal Using Dark Channel Prior", IEEE Transactions on Pattern Analysis and Machine Intelligence (vol. 33, Issue 12, Dec. 2011), Published on Sep. 9, 2010, pp. 2341-2353.
(Continued)

*Primary Examiner* — Jerome Grant, II
(74) *Attorney, Agent, or Firm* — Lee & Hayes, P.C.

(57) ABSTRACT

A sensor degradation detection and remediation system includes one or more sensors configured to collect image data from an environment. A combination of techniques may be used to detect degradations within regions of the image data captured by a sensor, including one or more of determining a level of the visual consistency between the associated image regions captured by different sensors, determining a level of opaqueness of the image regions, and/or measuring temporal movement of the image regions captured by a sensor over a period of time. Operations of a vehicle or other system may be controlled based at least in part on the detection of degradations of the image data captured by the sensors, including automated cleaning of a sensor surface, reducing a level of reliance on the image data received from the sensor, and/or changing a direction of travel of the vehicle.

19 Claims, 7 Drawing Sheets

(51) Int. Cl.
  *B60W 50/02* (2012.01)
  *B60W 50/029* (2012.01)
  *B60S 1/56* (2006.01)
(52) U.S. Cl.
  CPC ............... *G06T 2207/30168* (2013.01); *G06T 2207/30252* (2013.01)

(56) References Cited

U.S. PATENT DOCUMENTS

| | | | |
|---|---|---|---|
| 10,310,509 B1 | 6/2019 | Ferguson et al. | |
| 2006/0228001 A1* | 10/2006 | Tsukamoto | G06K 9/00791 382/104 |
| 2012/0057036 A1* | 3/2012 | Ishii | H04N 5/23264 348/208.6 |
| 2013/0057714 A1* | 3/2013 | Ishii | H04N 5/23248 348/208.4 |
| 2013/0266210 A1* | 10/2013 | Morgan-Mar | G06T 7/571 382/154 |
| 2017/0070664 A1* | 3/2017 | Yoon | H04N 5/232945 |
| 2018/0024562 A1 | 1/2018 | Bellaiche | |
| 2018/0196439 A1 | 7/2018 | Levinson et al. | |
| 2018/0324383 A1* | 11/2018 | Kaneko | H04N 5/77 |
| 2018/0342113 A1 | 11/2018 | Kislovskiy et al. | |
| 2019/0035057 A1* | 1/2019 | Naserian | G06T 5/002 |
| 2019/0182930 A1* | 6/2019 | Broers | H05B 47/11 |
| 2020/0167901 A1* | 5/2020 | Fors | G06T 5/50 |
| 2020/0314401 A1* | 10/2020 | Miyake | H04N 9/735 |
| 2020/0389582 A1* | 12/2020 | Herman | H04N 5/23218 |
| 2021/0021815 A1* | 1/2021 | Wang | H04N 19/119 |

OTHER PUBLICATIONS

Ito, et al., "An Adherent Raindrop Detection Method Using MSER", Proceedings of APSIPA Annual SUmmit and Conference 2015, Dec. 16-19, 2015, 5 pages.
Pan, et al., "Blind Image Deblurring Using Dark Channel Prior", IEEE, retrieved on Nov. 8, 2019 at <<https://www.cv-foundation.org/openaccess/content_cvpr_2016/papers/Pan_Blind_Image_Deblurring_CVPR_2016_paper.pdf, 9 pages.
Webster, "Improved Raindrop Detection Using Combined Shape and Saliency Descriptors With Scene Context Isolation", Cranfield University, Bedfordshire, UK, retrieved on Nov. 8, 2019 at <<http://dro.dur.ac.uk/16549/1/16549.pdf>>, 6 pages.
You, et al., "Adherent Raindrop Detection and Removal in Video", The University of Tokyo, retrieved on Nov. 7, 2019 at <<http://openaccess.thecvf.com/content_cvpr_2013/papers/You_Adherent_Raindrop_Detection_2013_CVPR_paper.pdf>>, 8 pages.
The PCT Search Report and Written Opinion dated Mar. 18, 2021 for PCT Application No. PCT/US20/66398, 10 pages.

\* cited by examiner

SENSOR DEGRADATION DETECTION AND REMEDIATION

BACKGROUND

Data captured by vehicle sensors within an environment can be used to assist in vehicle navigation and obstacle avoidance as the vehicle moves through the environment. For example, cameras and other vehicle sensors may collect image data that vehicles may analyze and use in real-time for navigation, obstacle detection, and avoidance of roadway obstructions. However, the quality of the data collected by vehicle sensors may become degraded in certain circumstances, including based on environmental factors such as weather, traffic, or road conditions, as well as based on internal errors or malfunctions that may occur within the sensors themselves. In such cases, the data collected by the vehicle sensors may be suboptimal or even unsuitable for use, potentially impacting vehicle navigation, obstacle detection and avoidance, and other vehicle functions that rely on the sensor data.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
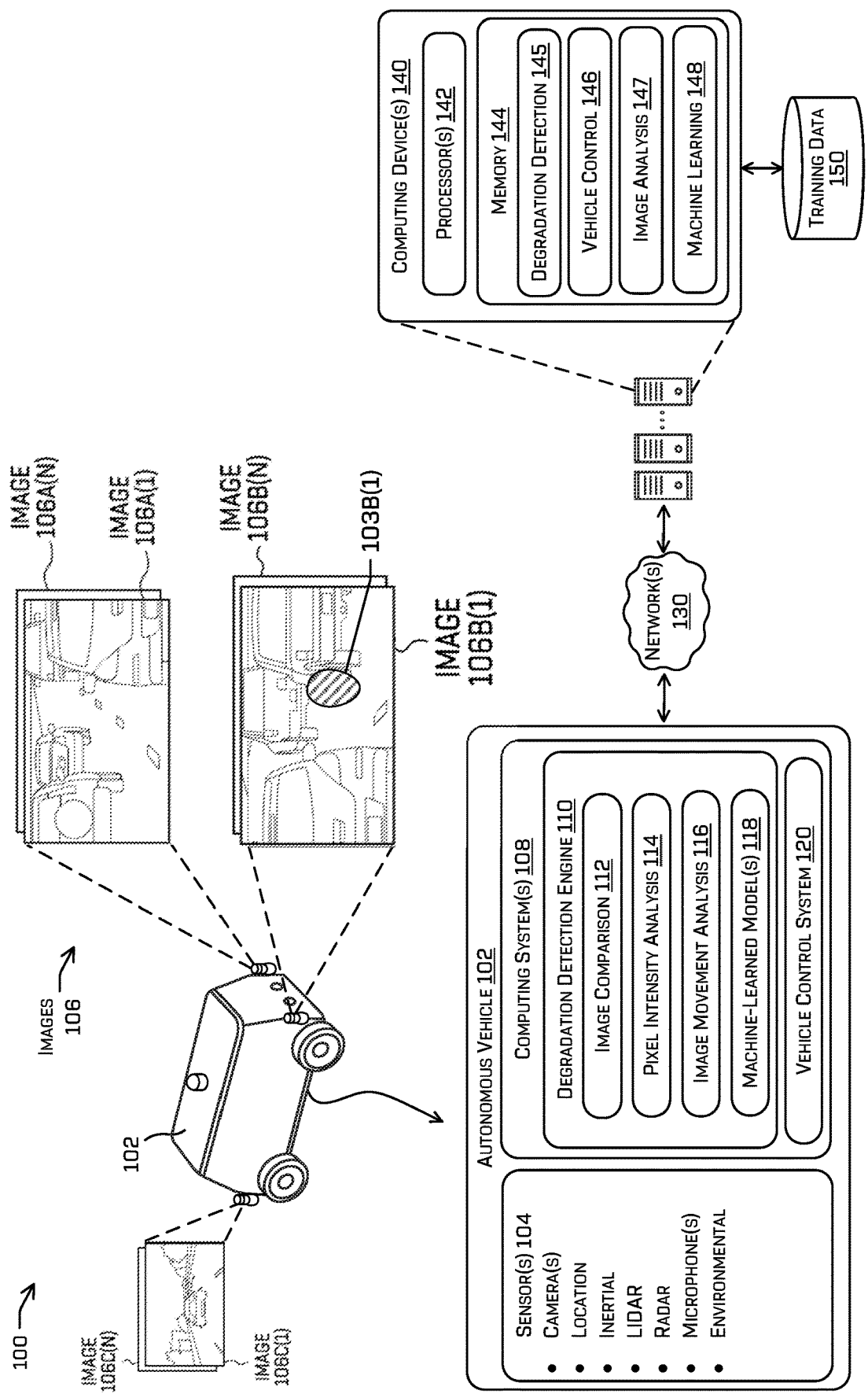
FIG. 1 illustrates an example vehicle system that collects and analyzes image data within an environment and detects degradations within the image data.

As discussed above, the quality of the data collected by vehicle sensors may become degraded in certain circumstances, including based on environmental factors such as weather, traffic, or road conditions. This disclosure is directed to systems and techniques for detecting degradations in sensor data collected by sensors, and for controlling various systems based on the detection of degradations. For example, the quality of image data captured by cameras and other sensors may be degraded by sensor obstructions (e.g., dirt, mud, rain drops, snow, or other material on a lens of a sensor) and/or environmental conditions (e.g., optical flares, fog, rain, snow, exhaust, etc.), and/or errors or malfunctions within the sensors themselves (e.g., focusing errors, damage of camera lenses, mounts, or to other sensor parts, errors in image capture or processing software, etc.). Systems and techniques according to this disclosure may allow the degradations in image data captured by sensors to be detected and identified using a combination of image capture and analysis techniques. In some examples, one or more systems can be controlled to resolve or remediate the degradations in the image data. Certain techniques are described in the context of sensors of an autonomous vehicle. However, the techniques described herein may be usable in connection with non-autonomous vehicles, as well as other robotic systems. For example, the techniques discussed herein may be applied to manufacturing, location monitoring and security systems, augmented reality, etc.

In some examples, a stereo matching technique may be implemented, in which image data may be captured by multiple different sensors (e.g., cameras) of a vehicle, and analyzed for visual consistency to identify degradations within the image data from one or both of the sensors. Though discussed throughout with respect to stereo images, the invention is not meant to be so limiting as any multi-view geometry is contemplated so long as there is at least a partial overlap of fields of view. Overlapping images from different vehicle sensors may be captured, rectified, and analyzed to match corresponding regions within the image data. The level of visual consistency between the image regions may be compared to detect a degradation in one of the vehicle sensors.

Other techniques may be used instead of or in conjunction with a stereo matching image analysis. For example, a dark channel technique may be implemented, in which a sequence of images may be captured from a vehicle sensor, and a pixel intensity analysis may be performed on associated image regions. A minimum dark channel value may be identified based on the pixel intensities from the image region within the sequence of images, and the dark channel value may be used to detect a degradation in the image data. For example, a dark channel value may be determined for an image, based on the intensity values associated with different image channels of the data. An average dark channel image value also may be generated for the image, based on intensity values for the dark channel value of multiple associated image frames captured over time. A dark channel intensity threshold may be generated, for example, based on the average intensity across different regions of the average dark channel image, and then specific image regions (e.g., pixels) may be compared to dark channel intensity threshold. Image regions having greater intensities than the dark channel intensity threshold may have a higher probability of being degraded by particular occlusions such as optical flares, haze, fog, or raindrops, which may cause higher dark channel intensities.

An additional or alternative technique for detecting degradations in image data captured by vehicle sensors may include measuring the temporal movement of an image region with respect to the other surrounding image regions. For example, a sequence of images may be captured from a vehicle sensor over a period of time when the vehicle is moving. The temporal movement of an image region may be analyzed and compared to the temporal movement of adjacent image regions, and a degradation in the image data may be detected based on differences in the relative temporal movement of the surrounding image regions.

Additionally or alternatively, one or more machine learned models may be used to detect degradations in image data captured by vehicle sensors. In such cases, machine-learning models and/or training data repositories may operate on the vehicle and/or on external computer systems, to train a machine-learned model to accurately identify various types of degradations (e.g., dirt, mud, raindrops, optical flares, fog, lens focusing errors, etc.). An image analysis component may analyze and classify the training data, and a machine-learning engine may generate and train machine-learning models based on the classified training data. In some examples, ground truth training data may be obtained automatically or semi-automatically from log data captured and stored by vehicles traversing an environment. Various different machine-learning techniques and algorithms may be used, and in some cases multiple different trained models may be used in combination with the additional degradation detection and remediation techniques described herein. In some examples, log data previously collected by a vehicle may be used to label training data. For example, a vehicle occupant or operator may use a control to input the current weather (e.g., "rain"), and a corresponding hashtag or other metadata label may be added to the data. Additionally or alternatively, other vehicle sensors (e.g., rain sensors) may be used to initiate a capturing and labeling of sensor data to be used as training data for a machine-learned model. In other examples, when a remediation technique is used to remove or repair an occlusion (e.g., a sensor cleaning to remove dirt or mud), then a failure to detect the occlusion after the remediation technique is performed may be used to confirm the occlusion, and the sensor data collected prior to the remediation technique may be captured and labeled to be used as training data for a machine-learned model.

Using these and other techniques described herein, degradations in the image data captured by vehicle sensors may be detected and the sources or types of the degradations may be identified. Such degradations may be caused by, for example, substances on the surfaces of the vehicle sensors, optical flares (e.g., sun flares or lens flares caused by headlights, street lights, or other lighting phenomena within the detection field of the vehicle sensor), other environmental factors such as fog that impact visibility, or focusing errors or other malfunctions of the vehicle sensors. In other examples, degradations may be detected based on miscalibrations of the vehicle sensors, which may be caused by an object (e.g., a pedestrian) bumping the sensor, or normal vibrational modes, etc.

When degradations in the image data from vehicle sensors are detected, the systems and techniques described herein may include controlling operations of the vehicle to resolve, mitigate, and/or remediate the effects of the degradations. For example, automated cleaning operations may be initiated to clean the surfaces of sensors to resolve a detected degradation. In other cases, the navigation and control systems of the autonomous vehicle may reduce a level of reliance on the image data received from the sensors at which a degradation has been detected, and/or the direction of travel of the vehicle may be changed to remediate the effects of the degradation. Thus, techniques and embodiments described herein may provide technical advantages that improve the performance of autonomous vehicles and other computer systems relying on sensor data, including faster and more accurate detection of sensor obstructions and errors, improved remediation techniques such as remediation based on the type (or source) and/or severity of a sensor degradation, more efficient processing of sensor data based on detected degradations in sensor data, improvements in safety of autonomous vehicles or/and overall performance improvements in computer systems relying on sensor data.

Example Architecture

FIG. 1 illustrates an example autonomous vehicle system 100 that detects degradations in image data captured by vehicle sensors and controls the operation of the vehicle based thereon. In some instances, an autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. Moreover, in some instances, the techniques for detecting degradations in vehicle sensor data, and the associated vehicle control operations described herein may be usable by non-autonomous vehicles as well. Also, while examples are given in which the vehicle is a land vehicle, the techniques described herein are also applicable to aerial, marine, and other vehicles. It is contemplated that the techniques discussed herein may apply to more than robotic control, such as for autonomous vehicles. For example, the techniques discussed herein may be applied to manufacturing, location monitoring and security systems, augmented reality, etc.

According to the techniques discussed herein, the autonomous vehicle 102 may receive sensor data from sensor(s) 104 of the autonomous vehicle 102. For example, sensor(s) 104 may include cameras configured to capture image data of an external environment surrounding the vehicle. As shown in this example, multiple different camera sensors 104 may be installed on and/or integrated into the autonomous vehicle 102 at different positions on the vehicle 102. Such sensors 104 also may be of different types or qualities, may be oriented at different angles, and may be configured with different image capture characteristics (e.g., different focal lengths, capture rates, focal points, fields of view, color capabilities, etc.), in order to capture a variety of different images 106 of the environment surrounding the autonomous vehicle 102. Sensor(s) 104 thus may include any number of cameras associated with the autonomous vehicle 102, including common optical or light-based cameras, as well as infrared cameras, thermal imaging cameras, and night vision cameras, each of which may be configured to capture different images 106 from the environment of the autonomous vehicle 102. Accordingly, images 106 captured by the sensor(s) 104 may include, for example, night vision images in which lower light levels have been amplified to allow nearby objects to be distinguished, or thermographic images captured by infrared or thermal imaging cameras.

The sensors 104 of the autonomous vehicle 102 may additionally or alternatively include one or more Light Detection and Ranging (lidar) systems configured to transmit pulsed lasers for measuring distances to nearby objects, Radio Detection and Ranging (radar) systems configured to use radio waves to detect and determine distances to nearby objects, sonar sensors configured to use sound pulses to measure object distances or depths, time-of-flight sensors configured to measure object distance based on time differences between emission of signals and their return to the sensor, or other sensors configured to capture other information about the environment. Further sensors 104 of the autonomous vehicle 102 may include ultrasonic transducers, sonar sensors a Global Positioning System (GPS) which receives a location signal (e.g., a GPS signal), as well as movement sensors (e.g., speedometers, compasses, accelerometers, and/or gyroscopes) configured to detect the current location, movement, and orientation of the autonomous vehicle 102. Additional sensors 104 may also include magnetometers, a wheel encoder sensors, microphones and other audio sensors, as well as environmental and weather sensors (e.g., temperature sensors, light sensors, pressure sensors, rain and precipitation sensors, wind sensors, etc.).

As shown in FIG. 1, sensor(s) 104 may include multiple instances of each of these or other types of sensors. For instance, the lidar sensors may include multiple individual lidar sensors located at the corners, front, back, sides, and/or top of the vehicle 102. As another example, the camera sensors may include multiple cameras disposed at various locations about the exterior and/or interior of the vehicle 102. In some examples, different sensors 104 of the same type (e.g., multiple cameras) and/or different sensors of different types (e.g., one camera and one lidar system) may have at least partially overlapping fields of view. The sensor(s) 104 may provide input to the vehicle computing system(s) 108, and/or may transmit sensor data, via one or more networks 130, to various external computing device(s) and systems (e.g., computing device(s) 140) at a determined frequency, after a lapse of a predetermined period of time, in near real-time, etc.

Using data captured by various sensors 104, the autonomous vehicle 102 may receive image(s) 106A(1) to 106A(N) (collectively "images 106A") from a first sensor 104 (e.g., camera sensor 104A), image(s) 106B(1) to 106B(N) (collectively "images 106B") from a second sensor 104 (e.g., camera sensor 104B), image(s) 106C(1) to 106C(N) (collectively "images 106C") from a third sensor 104 (e.g., camera sensor 104C), and so on. A small obstruction 103B(1) is shown in image 106B(1) in this example, indicating that an occlusion (e.g., a raindrop) or other obstruction may be adhered to a surface or lens of the sensor 104 producing images 106B. Additional sets of image data may be received from sensors 104 such as thermographic and night vision cameras, or lidar and/or radar systems, and these image data may be collectively referred to as images 106. Additionally, although this disclosure may primarily discuss images 106 in reference to visual images, for ease and to better illustrate the techniques and concepts described herein, it is contemplated that techniques and concepts may be applied to any sensor data that has the capability to identify and represent objects within the environment of the autonomous vehicle 102 (e.g., a lidar point cloud including points that represent an object).

In some examples, the autonomous vehicle 102 may include one or more computing system(s) 108 that may include a degradation detection engine 110 and a vehicle control system 120. As shown in this example, the degradation detection engine 110 executing on the computing system(s) 108 of the autonomous vehicle 102 may include one or more components and/or subsystems configured to detect degradations of the image data 106 captured by the vehicle sensors 104. Different subsystems or components within the degradation detection engine 110 may be implemented to perform different degradation detection techniques, including an image comparison component 112, a pixel intensity analysis component 114, and an image movement analysis component 116. These techniques, each of which is discussed in more detail below, may be used individually or in combination by the degradation detection engine 110 to analyze the image data 106 captured by the vehicle sensors 104, and to detect and identify degradations within the image data 106.

Additionally, in some embodiments, the computing system(s) 108 of the autonomous vehicle 108 may include one or more machine-learned models 118 configured to receive, store, and execute machine-learned models trained to detect degradations in sensor data. In various examples, the machine-learned models 118 (and/or the machine learning engine 148, discussed below) may be implemented as a neural network and/or other trained machine-learning model. For example, neural networks and/or any other machine-learning techniques with the machine-learned models 118 may be trained to receive image data 106 and/or various other sensor data captured by sensors 104 of the autonomous vehicle 102, and then analyze and detect degradations within the sensor data caused by opaque substances or raindrops on the surfaces of the sensors 104, optical flares and other visual phenomena affecting the image data, and/or focusing errors or other malfunctions of the sensors 104.

As noted above, machine-learned models 118 may include one or more artificial neural networks. A neural network is a biologically inspired technique, in which input data may be transmitted through a series of connected layers to produce an output. Each layer in a neural network also may comprise another neural network, or may comprise any number of layers (whether convolutional or not). As can be understood in the context of this disclosure, a neural network may utilize machine learning, which may refer to a broad class of such techniques in which an output is generated based on learned parameters.

In other embodiments, machine-learned models 118 (and machine learning engine 148, discussed below) may include any other type of machine learning techniques and algorithms may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

Computing system(s) 108 also may include a vehicle control system 120 to initiate one or more remediation operations on the autonomous vehicle 102, in response to degradations detected in the image data 106 by the degradation detection engine 110. The vehicle control system 120 may include one or more system controllers, which may be configured to control any or all systems of the autonomous vehicle 102, including perception, planning, steering, propulsion, braking, safety systems, emitters, communication, etc. As one example described below in more detail, in response to the detection of an opaque substance (e.g., dirt, mud, a raindrop) on a surface of a vehicle sensor 104, the vehicle control system 120 may initiate a sensor cleaning process to attempt to remove the opaque substance from the surface. In other examples, the vehicle control system 120 may change the orientation and/or the direction of travel of the autonomous vehicle 102 in response to detection of degradation in the image data 106 received from one or more sensors 104 on one end of the vehicle 102. In still other examples, the vehicle control system 120 may change configuration settings within the navigation and/or safety systems of the autonomous vehicle 102 to reduce reliance on the image data 106 (e.g., down weight a confidence) associated with any sensors 104 at which a degradation has been detected.

Although not shown in FIG. 1 so as not to obscure the other components illustrated therein, the computing system(s) 108 in the autonomous vehicle 102 may include processing unit(s) having one or more processors and memory communicatively coupled with the one or more processors. The degradation detection engine 110, vehicle control system 120, and the other subsystems and components within computing system(s) 108 herein may be implemented in hardware, software, or a combination of hardware and software components. In some embodiments, the subsystems or components within the degradation detection engine 110 and/or vehicle control system 120 may be implemented as computer-executable instructions or other software code components stored on a non-transitory computer-readable medium within the computing system(s) 108, which may be executed by the processors of the computing system(s) 108 to perform the functions described herein. Additionally, although depicted in FIG. 1 as residing in the internal computing system(s) 108 of the autonomous vehicle 102 for illustrative purposes, it is contemplated that one or more of the vehicle sensors 104, the degradation engine 110, and the vehicle control system 120, may be accessible to the vehicle 102 (e.g., stored on, or otherwise accessible by, memory remote from the vehicle 102, such as, for example, on memory 144 of a remote computing device 140).

Also, while the components discussed herein (e.g., the degradation detection engine 110, the image comparison component 112, the pixel intensity analysis component 114, the image movement analysis component 116, the machine-learned models 118, the vehicle control system 120) are described as divided for illustrative purposes, the operations performed by the various components may be combined or performed in any other component of the vehicle computing system(s) 108.

The autonomous vehicle 102 may also include one or more wireless transceivers and/or other network devices to enable network connections and communications between the vehicle 102 and one or more other local or remote computing device(s). For instance, one or more wireless network interfaces within the computing systems(s) 108 may facilitate communication with other local computing system(s) 108 on the same autonomous vehicle 102, other computing system(s) within other autonomous vehicles, and/or various remote computing devices and systems (e.g., computing device(s) 140). Such network interfaces and associated communications systems also may enable the vehicle 102 to communicate with a remote teleoperations computing device or other remote services.

Within the autonomous vehicle 102, wireless transceivers, physical and/or logical network interfaces, and/or other network components may allow the vehicle computer system 108 to access and connect to other computing devices or networks, such as network(s) 130. The communication systems of the vehicle 102 may enable Wi-Fi-based communication such as via frequencies defined by the IEEE 1402.11 standards, short range wireless frequencies such as Bluetooth, cellular communication (e.g., 2G, 3G, 4G, 4G LTE, 5G, etc.) or any suitable wired or wireless communications protocol that enables the respective computing system of the vehicle to interface with other computing device(s) or network(s).

In some embodiments, one or more autonomous vehicles 102 may receive and/or transmit data, through network(s) 130, to one or more back-end computing device(s) 140. Computing device(s) 140 may include processor(s) 142 and a memory 144 storing various components configured to interact with the computing system(s) 108 of one or more autonomous vehicles 102. For example, the computing device(s) 140 may include a degradation detection component 145 configured to communicate with the degradation detection engine 110 of one or more autonomous vehicles 102, a vehicle control component 146 configured to communicate with the vehicle control system 120 of one or more autonomous vehicles 102, and so on.

In some embodiments, an autonomous vehicle 102 may transmit any or all sensor data captured via sensors 104, including image data 106, to computing device(s) 140. Such sensor data may include raw sensor data, processed sensor data, and/or representations of sensor data. In some examples, the sensor data (raw or processed) may be stored and/or sent as one or more log files.

Additionally or alternatively, autonomous vehicles 102 may transmit to computing device(s) 140 data associated with detected degradations, such as data indicating that a degradation in image data 106 has been detected, the particular sensor 104 for which the degradation was detected, the type or source of the degradation (e.g., dirt or mud, rain, an optical flare, a sensor error, etc.), the time and geographic location associated with the degradation, the remediation operation(s) performed (e.g., sensor cleaning, reduction of reliance on sensor data, change of vehicle orientation or direction of travel, etc.), and/or data indicating whether or not the remediation operation(s) were successful.

Further, although the example system of FIG. 1 may operate based on image data 106 captured directly by the sensors 104 of the autonomous vehicle 102, in some embodiments the vehicle 102 may receive some or all of its image data 106 from the computing device(s) 140 and/or other remote data sources. For example, the autonomous vehicle 102 may communicate via network(s) 130 and receive image data 106 and/or other sensor data from other autonomous vehicles located near the vehicle 102, traffic cameras or traffic sensors in the vicinity of the vehicle 102, building or parking lot security cameras, and/or from satellite image systems in communication with computing devices 140.

In some embodiments, the degradation detection component 145 in the computing device(s) 140 may analyze degradation detection data received from one or more autonomous vehicles 102. Based on the data received from vehicles 102, and/or based on degradation detection policies received from a system administrator, the degradation detection component 145 may generate and update the degradation detection techniques to be used by the autonomous vehicles 102. For example, the degradation detection component 145 may select different combinations of degradation detection techniques (e.g., image comparison component 112, pixel intensity analysis component 114, and/or image movement analysis component 116) to be used by the autonomous vehicle 102. The degradation detection component 145 also may select and change the algorithms, matching thresholds, and other configuration settings to be used by the various degradation detection techniques. These updated degradation detection techniques and algorithms may be transmitted to the autonomous vehicle 102 for deployment within the degradation detect engine 110, thereby allowing the back-end computing device(s) 140 to remotely and dynamically modify/optimize the degradation detection behaviors of the autonomous vehicle 102 and/or other autonomous vehicles in a fleet of autonomous vehicles.

Further, in some embodiments, the computing device(s) 140 may communicate with multiple different autonomous vehicles 102 and may transmit different sets of degradation detection instructions to the different vehicles 102. For example, the computing device(s) 140 may select different degradation detection techniques and algorithms for different vehicles, based on the capabilities of the vehicles (e.g., the numbers and locations of sensors 104, the cruising speed, acceleration, and braking capabilities of the vehicle 102, the remediation operations supported by the vehicle 102 for address degradations in sensor data, etc.), the current driving behavior of the vehicle 102 (e.g., the current vehicle speed, road surface, traffic levels, number and profile of occupants, etc.), the current geographic location in which the vehicle 102 is operating (e.g., the county, state, country, or other legal jurisdiction), and/or the current environmental conditions around the vehicle (e.g., the current weather conditions, road conditions, time of day, lighting conditions, etc.).

The vehicle control component 146 in the computing device(s) 140 may be configured to receive data from and/or transmit data to autonomous vehicle(s) 102 that may control the operations of the vehicle control systems 120 at the vehicle(s) 102. For instance, vehicle control component 146 may determine and transmit instructions to vehicle 102 to control the remediation behaviors that will be implemented by the vehicle 102 when a degradation in image data 106 is detected. Examples of such remediation behaviors may include which remediation techniques (e.g., automated sensor surface cleaning, change in vehicle traveling direction or orientation, reduction of reliance on sensor data, etc.) are performed in response to different types and severities of degradations of sensor data. Similar to the degradation detection component 145, the vehicle control component 146 may determine a preferred or optimized set of remediation behaviors based on feedback data received from the autonomous vehicles 102 and/or based on degradation remediation policies received from a system administrator. Additionally, the vehicle control component 146 may select and transmit different sets of degradation remediation instructions to different autonomous vehicle(s) 102, based on any of the vehicle-specific factors described above (e.g., vehicle capabilities, current driving behavior, geographic location, environment, etc.) or others.

As noted above, in some embodiments the computing device(s) 140 may be configured to generate and train machine-learning models to be used in the detection of degradations of image data 106, and/or in the selection of remediation operations to be performed at the autonomous vehicles 102 in response to the detected degradations. In such cases, the computing device(s) 140 may include an image analysis component 147, a machine-learning engine 148, and/or a training data repository 150. Training data 150 may include sets of image data 106 received from autonomous vehicle(s) 102 and/or other external data sources, including examples of images 106 captured by vehicle sensors 104 showing various types of degradations (e.g., dirt, mud, raindrops, optical flares, lens focusing errors, etc.), and other images 106 without any degradations. The image analysis component 147 may analyze and classify the training data 150, and the machine-learning engine 148 may generate and train machine-learning models based on the classified training data 150. Any of the various machine-learning techniques and algorithms described herein may be used, and in some cases multiple different trained models may be used in combination. In some embodiments, a trained machine-learning model may be generated by the computing device(s) 140 and transmitted to one or more autonomous vehicle(s) 102, at which the trained models may be executed in real-time to assist in the detection of degradations of the image data 106 captured by the vehicle sensors 104.

In some cases, training data 150 may include or may be derived from image data 106 captured by autonomous vehicle(s) 102. For example, image data 106 captured at the vehicle(s) 102 may be labeled (e.g., within the image metadata or using separate associated data) with corresponding degradation data that indicates whether or not the image data 106 includes a degradation (e.g., a visual obstruction or occlusion), as well as the type or source of degradations, the severity of degradations, the size and/or locations of degradations within the image data, etc. In some embodiments, the degradation data may be determined by analyzing additional sensor data and/or log data from the vehicle(s) 102. For example, when image data 106 captured and analyzed by an autonomous vehicle 102 is determined to include a degradation using one or more of the techniques described herein (e.g., stereo matching, dark channel, optical flow, etc.), that determination may be verified against vehicle log data of subsequently captured sensor data to see whether a remediation operation (e.g., sensor cleaning, change in vehicle direction or orientation, etc.) was performed in response to detected degradation in the image data 106, and if so, whether the remediation operation was successful. In some cases, if a remediation operation was performed and was determined to be successful, then the image data 106 may be labeled to indicate that a degradation is present in the image data 106 and used as ground truth for training a machine learning model. For instance, analyzing additional image data captured by the same sensor 104 after a sensor cleaning may confirm (or may refute) that a degradation detected before the sensor cleaning was in fact a sensor occlusion. Similarly, analyzing additional image data captured after a change in vehicle direction or orientation may confirm (or may refute) that a degradation detected before the change in vehicle direction or orientation was an optical flare. In some examples, an annotation service may be implemented including a user interface to output logged image data to users, and to receive input from the users indicating whether or not the image data is degraded. An annotation service also may receive input via the user interface indicating which portion or region of the image is degraded, and the source and/or type of the degradation. In another example, logged images may be used in a non-critical application. Failures of such an application may be assumed to be caused by degraded images of the set and may be flagged to be annotated as degraded. Additionally, in the event that a vehicle is unable to continue navigating autonomously due to degraded sensor data, one or more remedial actions may be taken (e.g., control of the vehicle may be taken over by a human driver, a request for assistance may be sent to a remote teleoperator, the vehicle may perform a safe stop maneuver, etc.) and the corresponding image data may be collected and added to the training data set for a machine-learned model.

In some embodiments, vehicle 102 and/or computing device(s) 140 may generate synthetic training data 150 (both purely synthetic, as well as augmented data), including degraded image data based on a library of non-degraded image data (whether real or synthetic). For example, one or more non-degraded images captured from vehicle 102 may be modified by using a transformation or filter to overlay a separate image layer that contains one or more synthetically generated image degradation regions. Thus, real image data captured from a vehicle 102 may be overlaid with one or more layers of synthetic degradation data containing representations of rain drops, spots of dirt or mud, optical flares, etc.

Computing device(s) 140 may implement one or more processes to generate synthetic degradation data, based on a predetermined set of characteristics associated with different types or sources of degradations. Because the size, density, and distribution of raindrops that may accumulate on a vehicle sensor 104 during a rain shower are not random, computing device(s) 140 may implement processes using preprogrammed raindrop sizes, shapes, and distribution patterns configured to model different types of rainstorms. For instance, a first pattern for misting rain may be stored, a second for heavy rain, a third for heavy rain in high traffic, a fourth for heavy rain at a slow speed, a fifth for heavy rain at a high speed, and so on. In some implementations, the computing device(s) 140 may execute a synthetic data generation process for a particular type/pattern of raindrops, using a set of preconfigured raindrop parameters for droplet birth rate, average size, size variation, death size, and/or droplet longevity. Using the set of preprogrammed parameters, along with randomization functions and distributions applied to the parameters, the synthetic degradation data generation process may generate a synthetic image of a raindrop pattern corresponding to a specific type and/or severity of rainstorm, as well as other conditions (e.g., lighting, traffic, vehicle speed). Additionally, although this example relates to generation of synthetic raindrop images, synthetic degradation data generation processes also may be used with sets of parameters for sizes, shapes, patterns, and distributions of other types of image data degradations, such as smears or spatterings of dirt or mud on a sensor surface, optical flares caused by the sun or upcoming headlights, etc.

The processor(s) of the computing system(s) 108 and the processor(s) 142 of the computing device(s) 140 may be any suitable processor capable of executing instructions to process data and perform operations as described herein. By way of example and not limitation, these processors may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory of the computing system(s) 108 and the memory 144 of the computing device(s) 140 are examples of non-transitory computer-readable media. The memory may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory of the computing system(s) 108 and the memory 144 of the computing device(s) 140 may include at least a working memory and a storage memory. For example, the working memory may be a high-speed memory of limited capacity (e.g., cache memory) that is used for storing data to be operated on by the associated processor(s). In some instances, the memory of the computing system(s) 108 and/or computing device(s) 140 may include a storage memory that may be a lower-speed memory of relatively large capacity that is used for long-term storage of data. In some cases, the processors of the computing system(s) 108 and/or computing device(s) 140 cannot operate directly on data that is stored in the storage memory, and data may need to be loaded into a working memory for performing operations based on the data, as discussed herein.

It should be noted that while FIG. 1 is illustrated as a distributed system, in alternative examples, components of the vehicle 102 may be associated with the computing device(s) 140 and/or components of the computing device(s) 140 may be associated with the vehicle 102. That is, the vehicle 102 may perform one or more of the functions associated with the computing device(s) 140, and vice versa.

Example Processes

Figure 2:
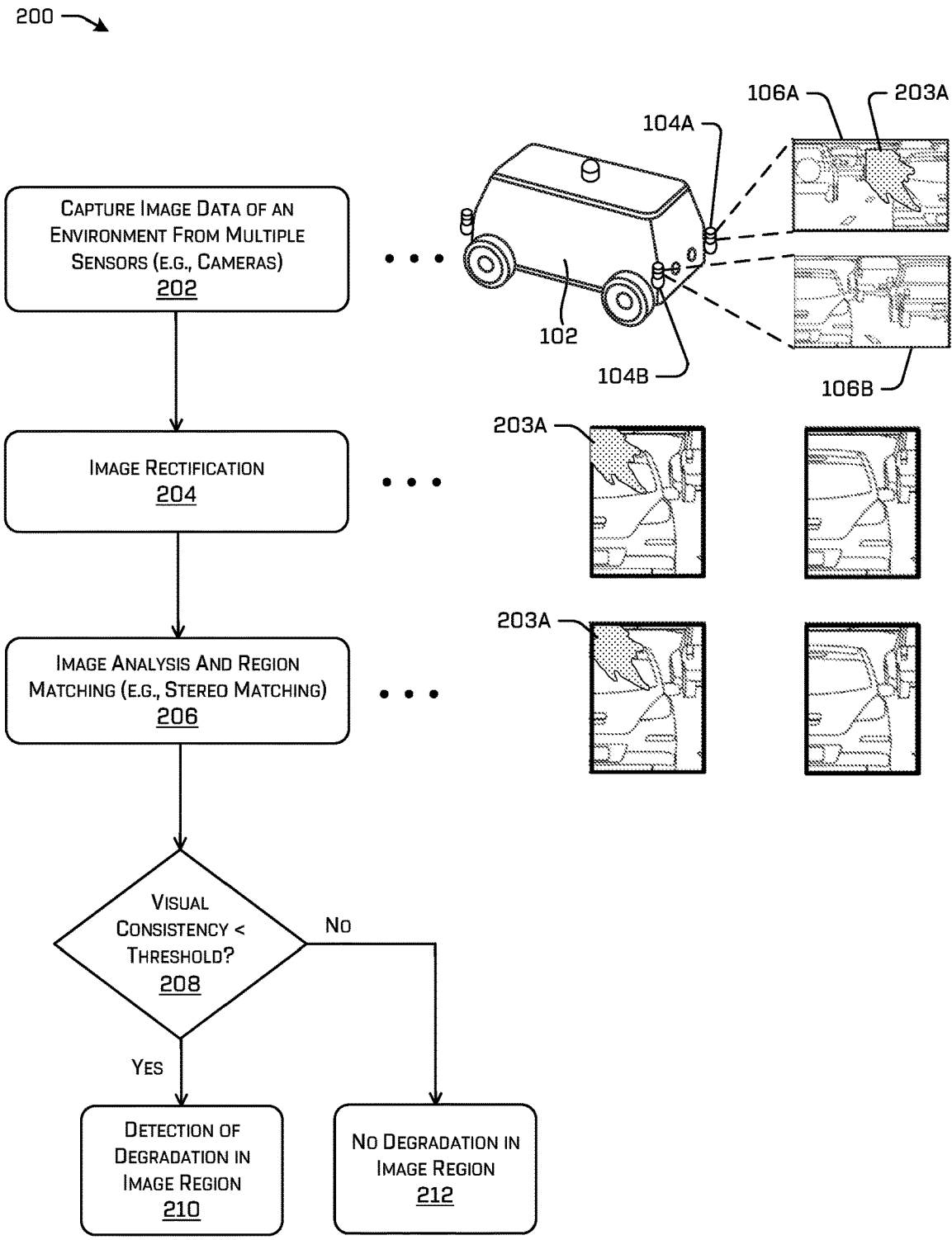
FIG. 2 illustrates a flow diagram of an example process for detecting degradations within the data captured by vehicle sensors, by capturing and analyzing data from multiple different vehicle sensors.

FIG. 2 illustrates an example process for detecting degradations within the data captured by vehicle sensors, using a stereo matching technique in which data from multiple different vehicle sensors is captured and analyzed. In some examples, process 200 may be accomplished by one or more component(s) of a vehicle system 100, such as an image comparison component 112 of an autonomous vehicle 102, which may operate independently or in conjunction with various other components within the vehicle 102 or external computing device(s) 140. While FIG. 2 is discussed in the specific context of detecting degradations in image data 106 based on images captured by two different vehicle cameras, it is to be understood that some embodiments may perform similar or identical operations based on images 106 captured from more than two cameras, images 106 captured by other types of vehicle sensors 104, and/or images 106 received from other data sources external to the autonomous vehicle 102.

At 202, image data 106 may be captured by multiple sensors 104 (e.g., cameras) of an autonomous vehicle 102. As shown in the illustrated portion of FIG. 2 associated with block 202, this description may refer to two visual images captured by cameras of the autonomous vehicle 102: a first image 106A captured by a first camera sensor 106A, and a second image 106B captured by a second camera sensor 104A. In some embodiments, the image comparison component 112 may be configured to receive images from two or more sensors 104 (e.g., cameras) having overlapping fields of view or detection. For example, the image comparison component 112 may retrieve previously captured images 106A and 106B, and/or may instruct sensors 104A and 104B to capture new images. Additionally, in some examples, the image comparison component 112 may require that images 106A and 106B were captured either simultaneously or within a small time window. As shown in this example, images 106A and 106B were captured at or near the same point in time, and include overlapping fields of view. Additionally, a small opaque substance 203A (e.g., dirt, mud, etc.) is adhered to a surface or lens of sensor 104A, causing the substance 203A to be visible in image 106A.

At 204, an image rectification process may be performed on images 106A and 106B, captured respectively by sensors 104A and 104B. The image rectification process may transform images 106A and 106B onto a common image plane. In some embodiments, a stereo rectification process may be executed, in which the image comparison component 112 may identify the image transformation which achieves a stereo system of horizontal epipolar lines within the common image plane. As noted above, although this example illustrates image rectification and region matching for two images 106A and 106B, it is understood that image data 106 from more than two vehicle sensors 104 (and/or image data 106 from other sources) may be rectified and region matched. In some examples, the rectification process at 204 may be optional, and/or other rectification techniques may be used. For example, full calibration data of each sensor relative to the other sensors (e.g., intrinsics and extrinsics) may be determined based on pre-stored information, and the image comparison component 112 and/or computing device(s) 140 may precompute which pixels map to one another within the different images. Thus, 204 may comprise a lookup or routine for comparison, as opposed to requiring an image rectification.

At 206, one or more regions within the first image 106A captured by the first sensor 104A may be matched to associated (or corresponding) image regions within the second image 106B captured by the second sensor 104B. The region size may be determined by the image comparison component 112 and/or may be received as a configuration setting by the computing device(s) 140. While smaller region sizes may be selected in certain embodiments and may provide technical advantages of identifying degradation regions with greater precision, larger region sizes may provide separate advantages of quicker image processing. Additionally, because sensors 104A and 104B may capture their respective images from different angles, some level of visual inconsistency between images 106A and 106B may be present, and therefore larger region sizes may provide better results.

In some embodiments, a naïve stereo matching process may be executed by the image comparison component 112. During the naïve stereo matching process, a minimum distance within a certain range along the common epipolar line may be determined and output to identify the associated or corresponding regions between images 106A and 106B. To determine the minimum distance, a sum of squared distance (SSD) technique may be used, which may better preserve color, brightness and exposure differences between the images in some embodiments. However, in other embodiments, other techniques may be used to determine the minimum distance. In some cases, sensors 104A and 104B also may be configured to have the same exposure/gain.

Further, in some examples, the naïve stereo matching process may calculate a second image disparity, in addition to the determination of the minimum distance. The second image disparity may be referred to as an infinite faraway matching disparity. To calculate the infinite faraway matching disparity between the two images, the patch distance between sensors 104A and 104B is directly used at the same place, and no searching along the epipolar line is required. Calculation of the infinite faraway matching disparity for the images 106A and 106B may allow the process to efficiently remove sky pixels which may have less or no value to the navigation and control systems of the autonomous vehicle 102. The result of the naïve stereo matching process may be a final posterior sigmoid, which may be calculated as the product of the two distances (e.g., the minimum distance disparity and the infinite faraway matching disparity).

In some examples, when performing the stereo matching process at 206, an exponentially increasing search range may be used from the top of images 106A and 106B to the bottom of the images. This may provide advantages over other stereo matching techniques, by compensating for the fact that, for images 106 captured by the sensors 104 of an autonomous vehicle 102, the bottom portions of images 106A and 106B may be assumed to be closer to the camera than the top portions of the images. Additionally, in some examples, the minimum distance used by the stereo matching technique to identify associated regions between images 106A and 106B, may be determined as a moving average of multiple different distance readings in order to remove any noise present in the distance readings.

After determining, at 206, that a first image region from image 106A is associated with (e.g., matches or corresponds to) a second image region from image 106B, then at 208 the first image region from image 106A and second image region from image 106B may be compared for visual consistency. As noted above, because images 106A and 106B may be captured by different sensors 104A and 104B at different locations on the vehicle, even associated matching images regions within any degradations will have slightly different perspectives. However, the associated regions of images 106A and 106B are likely to have much higher levels of visual consistency if there are no degradations (e.g., dirt, raindrops, optical flares, etc.) affecting either image 106A or 106B. In contrast, if a degradation has affected the associated regions of either image 106A or 106B, the level of visual consistency is likely to be much lower. In other examples, additional image features may be identified within the associated regions of images 106A or 106B, and additional image matching techniques such as Scale-Invariant Feature Transform (SIFT), Speeded-Up Robust Features (SURF), Oriented FAST and Rotated Brief (ORB) may be performed based on the extrinsic calibration. Additionally, a number of corners or edges may be detected within an image region, as a measure of blur, and may be compared to the relative number from the other associated image regions.

Accordingly, a visual consistency threshold may be defined and applied at 208 by the image comparison component 112, for each set of associated regions in images 106A and 106B. For each set of associated image regions, if the level of visual consistency is below the threshold (208: Yes), then the image comparison component 112 may determine at 210 that a degradation is affecting the image data captured by one or both of sensors 104A and 104B. As illustrated in this example, the presence of an opaque substance 203A (e.g., dirt, mud) within image 106A, which is not present in image 106B, may cause a lower level of visual consistency between image regions 106A and 106B. In contrast, if the level of visual consistency is at or above the threshold for the set of associated image regions (208: No), then the image comparison component 112 may determine at 212 that no degradation is affecting the image data captured by sensor 104A or sensor 104B.

Figure 3:
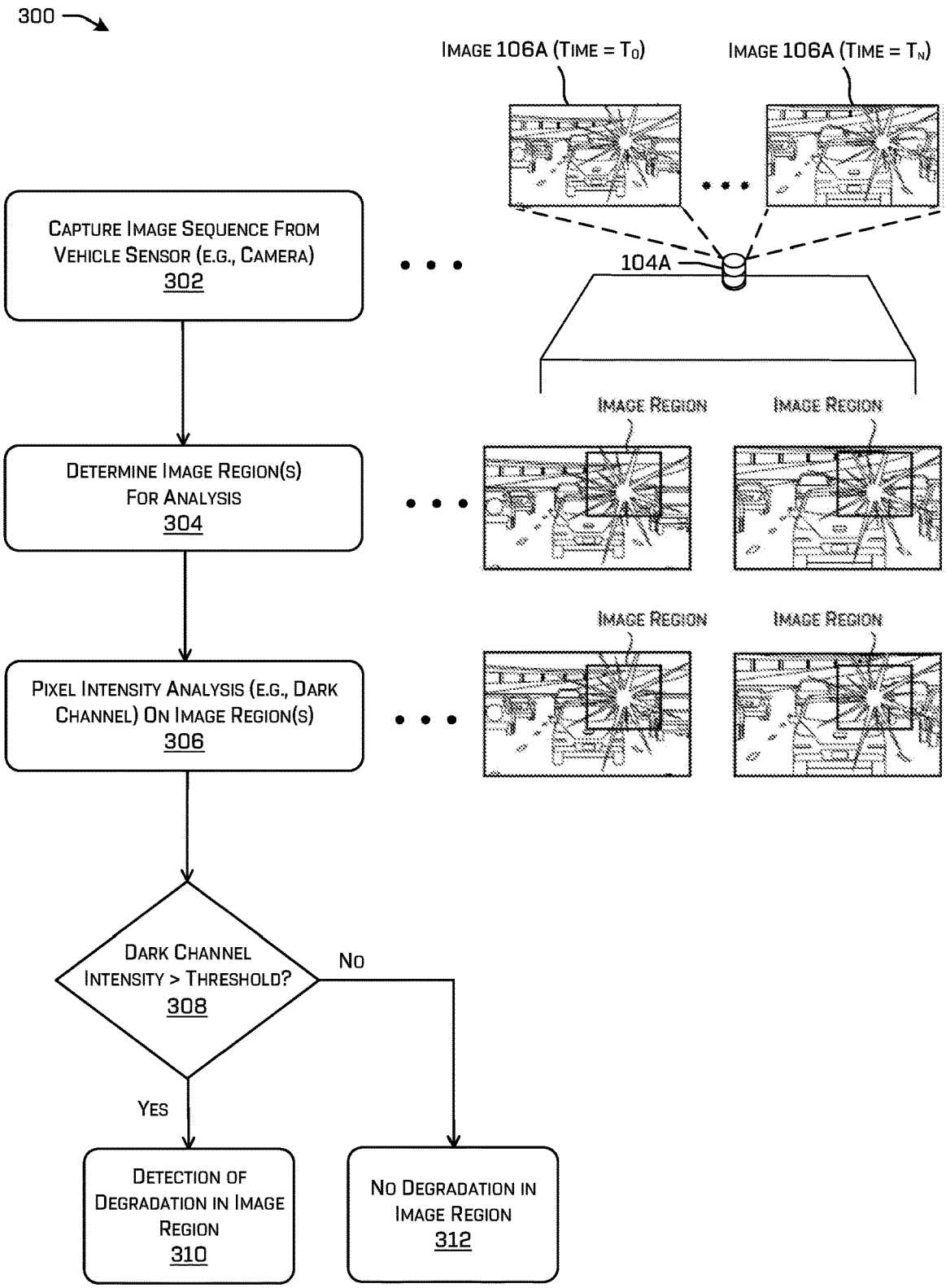
FIG. 3 illustrates a flow diagram of an example process for detecting degradations within the data captured by vehicle sensors, by analyzing pixel intensity within image data captured by vehicle sensors.

FIG. 3 illustrates another example process for detecting degradations within the data captured by vehicle sensors, using a dark channel technique in which pixel intensity is analyzed for image data captured by vehicle sensors. For example, a dark channel prior technique may be performed by analyzing the intensity values of pixels within images to detect haze and other degradations within the images. For a particular image or sequence of associated image frames captured at different times, a dark channel may be identified as the image channel having the lowest intensity. When degradations are present within images (e.g., optical flares, raindrops, fog or haze), then the dark channel pixel intensities for the degraded image regions may be greater than other image regions that are not degraded. Accordingly, measuring and comparing the dark channel intensities of specific image regions (e.g., pixels or groups of pixels) may be used to detect degradations at the specific image regions, as described below. In some examples, process 300 may be accomplished by one or more component(s) of vehicle system 100, such as a pixel intensity analysis component 114 of an autonomous vehicle 102, which may operate independently or in conjunction with various other components within the vehicle 102 or external computing device(s) 140. Although FIG. 3 is discussed in the specific context of detecting degradations in image data 106 based one or more images captured by a vehicle camera, it is to be understood that some embodiments may perform similar or identical operations based on images 106 captured by other types of vehicle sensors and/or images 106 received from other data sources external to the autonomous vehicle 102.

At 302, one or more images 106 may be captured by a sensor 104 (e.g., camera) of an autonomous vehicle 102. As shown in the illustrated portion of FIG. 3 associated with block 302, this description may refer to a series of multiple visual images captured by a single sensor 104A of the autonomous vehicle 102 at multiple different times, starting with a first image $106A(t_0)$ captured at time $t_0$, and ending with an image $106A(t_n)$ captured at a later time $t_n$. However, in other examples, the pixel intensity analysis of process 300 may be performed using a single image only.

At 304, pixel intensity analysis component 114 may determine one or more image regions within the image data received at 302. As discussed above, the region size may be determined by the pixel intensity analysis component 114 and/or may be received as a configuration setting by the computing device(s) 140. Additionally, smaller region sizes may be selected in certain embodiments and may provide technical advantages of identifying degradation regions with greater precision, while larger region sizes may provide separate advantages of quicker image processing. In some examples, region sizes as small as single pixels may be selected.

At 306, the pixel intensity analysis component 114 may perform a pixel intensity analysis on each of the image regions determined at 304. In some embodiments, the pixel intensity analysis at 306 may be a dark channel (or dark channel prior) technique, and a dark channel may be determined for the image or image regions, based on the intensity values associated with different image channels of the data. In a dark channel technique, the image region may be split into separate Red-Green-Blue (RGB) channels, and the minimum pixel intensity from the three channels may be selected. If the image region is not affected by a degradation, empirical analyses of captured images has demonstrated that at least one of the channel intensities is likely to be zero or close to zero (e.g., the dark channel for the image region). However, if image region is affected by certain types or sources of degradations, such as raindrops, optical flares, or camera focusing errors, then the degradation may cause the dark channel of the image region to have a higher pixel intensity value.

As noted above, the pixel intensity analysis at 306 may be performed for a single image 106A or for a series of images (e.g., $106A(t_0)$ to $106A(t_n)$) captured over a period of time by the vehicle sensor 104A. For single images, the dark channel intensity for the image region may correspond to the minimum pixel intensity out of the separate RGB channels within that image region. When a series of multiple images $106A(t_0)$ to $106A(t_n)$ is captured and analyzed, the pixel intensity analysis component 114 may perform the same pixel intensity analysis (e.g., dark channel) for each of the series of images, and then may select the minimum dark channel value for the image region out of the series of images. Additionally, although color channels RGB are used in this example, it is to be understood that any other color channel models or encoding systems (e.g., YUV, CMYK) may be used in other examples. In some examples, as average dark channel image value may be generated for the image data, based on intensity values for the dark channel of multiple associated image frames captured over time.

After determining, at 306, the pixel intensity (e.g., dark channel) values for one or more image regions of the image data 106, then at 308 the pixel intensity values for the image region(s) may be compared to an intensity threshold. For example, a dark channel intensity threshold may be generated based on the average intensity across different regions of the average dark channel image, and then specific image regions (e.g., pixels) may be compared to dark channel intensity threshold. Image regions having greater intensities than the dark channel intensity threshold may have a higher probability of being degraded by particular occlusions such as optical flares, haze, fog, or raindrops, which may cause higher dark channel intensities. As noted above, when using a dark channel technique, image regions affected by certain degradations may have higher minimum pixel intensities, whereas image regions unaffected by degradations may have lower minimum pixel intensities. Accordingly, a pixel intensity threshold (e.g., a dark channel threshold) may be defined and applied at 308 by the pixel intensity analysis component 114, for each region in the received image(s) 106. For each image region, if the pixel intensity value (e.g., dark channel value) is greater than the threshold (308:Yes), then the pixel intensity analysis component 114 may determine at 310 that a degradation is affecting the region of the image(s) 106 captured by sensor 104. In contrast, if the pixel intensity value (e.g., dark channel value) is less than the threshold (308:No), then the pixel intensity analysis component 114 may determine at 312 that no degradation is affecting the region of the image(s) 106 captured by sensor 104A.

Figure 4:
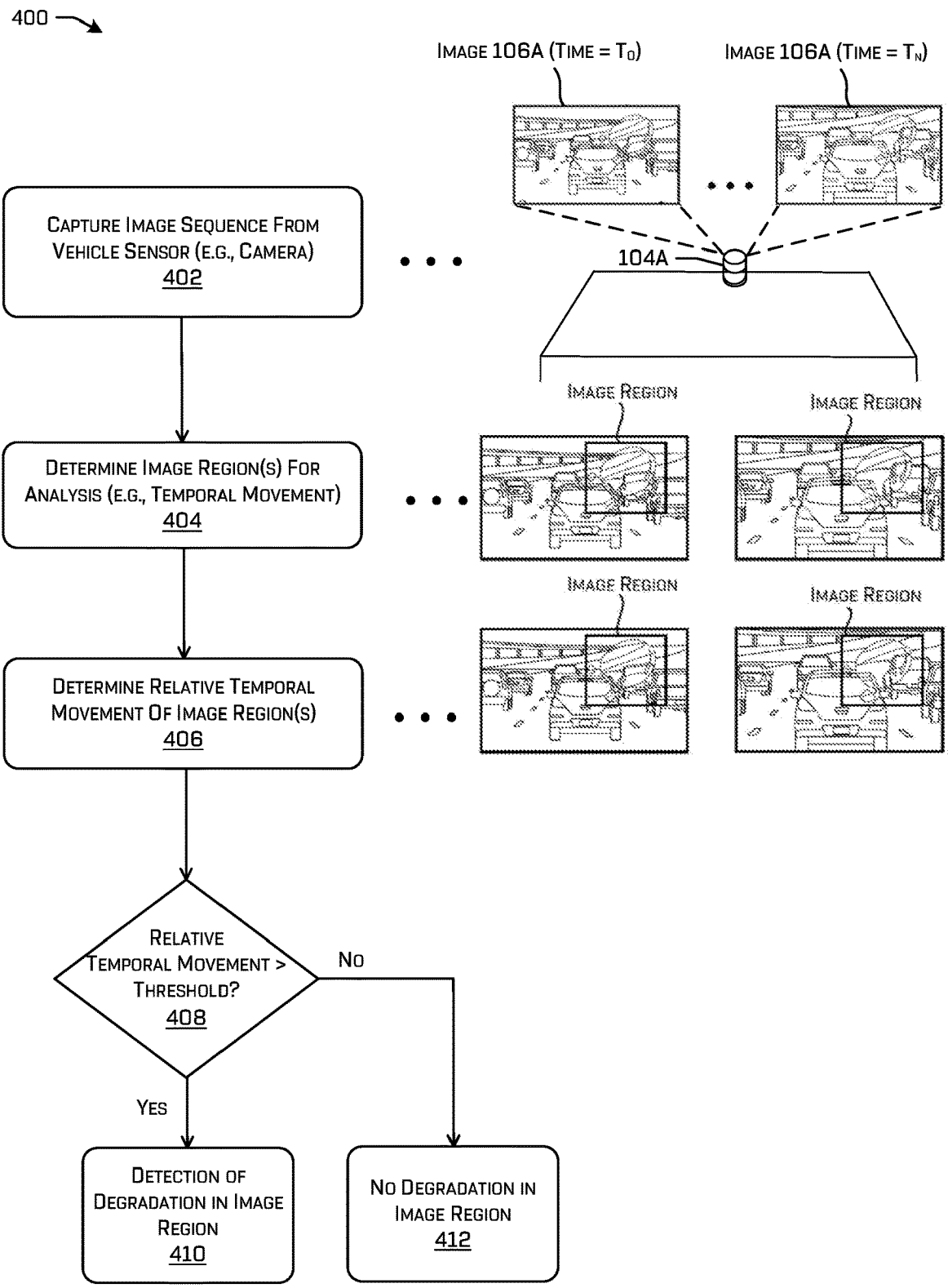
FIG. 4 illustrates a flow diagram of an example process for detecting degradations within the data captured by vehicle sensors, by analyzing relative temporal movement of image regions from a vehicle sensor over a time period.

FIG. 4 illustrates another example process for detecting degradations within the data captured by vehicle sensors, using an optical flow technique in which the temporal movement of image regions from a vehicle sensor are analyzed over a time period. In some examples, process 400 may be accomplished by one or more component(s) of vehicle systems 108, such as an image movement analysis component 116 of autonomous vehicle 102, which may operate independently or in conjunction with various other components within the vehicle 102 or external computing device(s) 140. Although FIG. 4 is discussed in the specific context of detecting degradations in image data 106A based a series (or sequence) of images 106A (e.g., $106A(t_0)$ to $106A(t_n)$) captured by a vehicle sensor 104A (e.g., camera), it is to be understood that some embodiments may perform similar or identical operations based on images 106 captured by other types of vehicle sensors 104 and/or images 106 received from other data sources external to the autonomous vehicle 102.

At 402, a series of images 106 may be captured by a sensor 104 (e.g., camera) of an autonomous vehicle 102. As shown in the illustrated portion of FIG. 4 associated with block 402, this description may refer to a series of multiple visual images captured by a single sensor 104A of the autonomous vehicle 102 at intervals within a time period, starting with a first image $106A(t_0)$ captured at time $t_0$, and ending with an image $106A(t_n)$ captured at an ending time $t_n$.

At 404, the image movement analysis component 116 may determine one or more image regions within the image data received at 402. As discussed above, the region size may be determined by the image movement analysis component 116 and/or may be received as a configuration setting by the computing device(s) 140. Additionally, smaller region sizes may be selected in certain embodiments and may provide technical advantages of identifying degradation regions with greater precision, while larger region sizes may provide separate advantages of quicker image processing.

At 406, the image movement analysis component 116 may determine the relative temporal movement of each of the image regions determined at 404. Temporal movement of an image region may refer to the visual changes that occur within that image region over the series of images $106A(t_0)$ to $106A(t_n)$. For example, when the autonomous vehicle 102 is in motion, it may be expected that the image data 106 captured by vehicle sensors 104 (e.g., cameras) may change continuously as the visual environment around the vehicle 102 changes (that is, as the position/perspective of the vehicle changes over time, so too does the view captured by the sensors 104). The rate of temporal movement may be based on the speed and direction of the vehicle 102, the type of environment surrounding the vehicle (e.g., highway versus city), and other factors. Accordingly, the relative temporal movement of an image region may refer to the temporal movement of that image region over the series of images, in comparison to the temporal movement of the adjacent image regions over the same series of images. In other examples, the measurements of temporal movement of an image region need not be relative in comparison to temporal movement of the adjacent image regions. For instance, temporal movement may be measured at 406 and compared to a threshold at 408 based on the temporal movement within the determined image region (e.g., without reliance on temporal movement of other regions in the same sequence of images). In such cases, if the temporal movement of the image region is lower than the threshold, the image movement analysis component 116 may determine a higher probability of an occlusion at the image region that is preventing the detection of temporal movement.

A high level of relative temporal movement of an image region may indicate that a degradation (e.g., dirt, a raindrop, an optical flare, etc.) is affecting the image data 106, either at the location of the image region or at the adjacent image regions. In contrast, a low level of relative temporal movement of an image region may indicate that no degradation is affecting the image data 106 at the location of the image region or at the adjacent image regions. Accordingly, a threshold for relative temporal movement may be defined and applied at 408 by the image movement analysis component 116, for each region in the received image(s) 106. For each image region, if the level of relative temporal movement is greater than the threshold (408:Yes), then the image movement analysis component 116 may determine at 410 that a degradation is affecting the region of the image(s) 106 captured by sensor 104 and/or adjacent image regions. In contrast, if the level of relative temporal movement is less than the threshold (408:No), then the image movement analysis component 116 may determine at 412 that no degradation is affecting the region of the image(s) 106 or adjacent image regions.

The three separate techniques described above for detecting degradations within the image data 106 captured by vehicle sensors 104, the visual consistency analysis between overlapping images captured by separate sensors 104 described in FIG. 2, the pixel intensity analysis of the image regions captured by a sensor 104 described in FIG. 3, and the relative temporal movement analysis of image regions captured by a sensor 104 described in FIG. 4, may be performed individually or in any combination in various embodiments. In additional examples, any combination of these three degradation detection techniques also may be performed in conjunction with other techniques, such as using one or more trained machine-learning models to analyze the image data 106 captured by the vehicle sensors 104. Thus, each of these techniques, whether individually or in combination, may provide technical advantages in autonomous vehicles or other sensor data processing computer systems, by improving the speed and accuracy of detection of sensor obstructions and errors.

Figure 5:
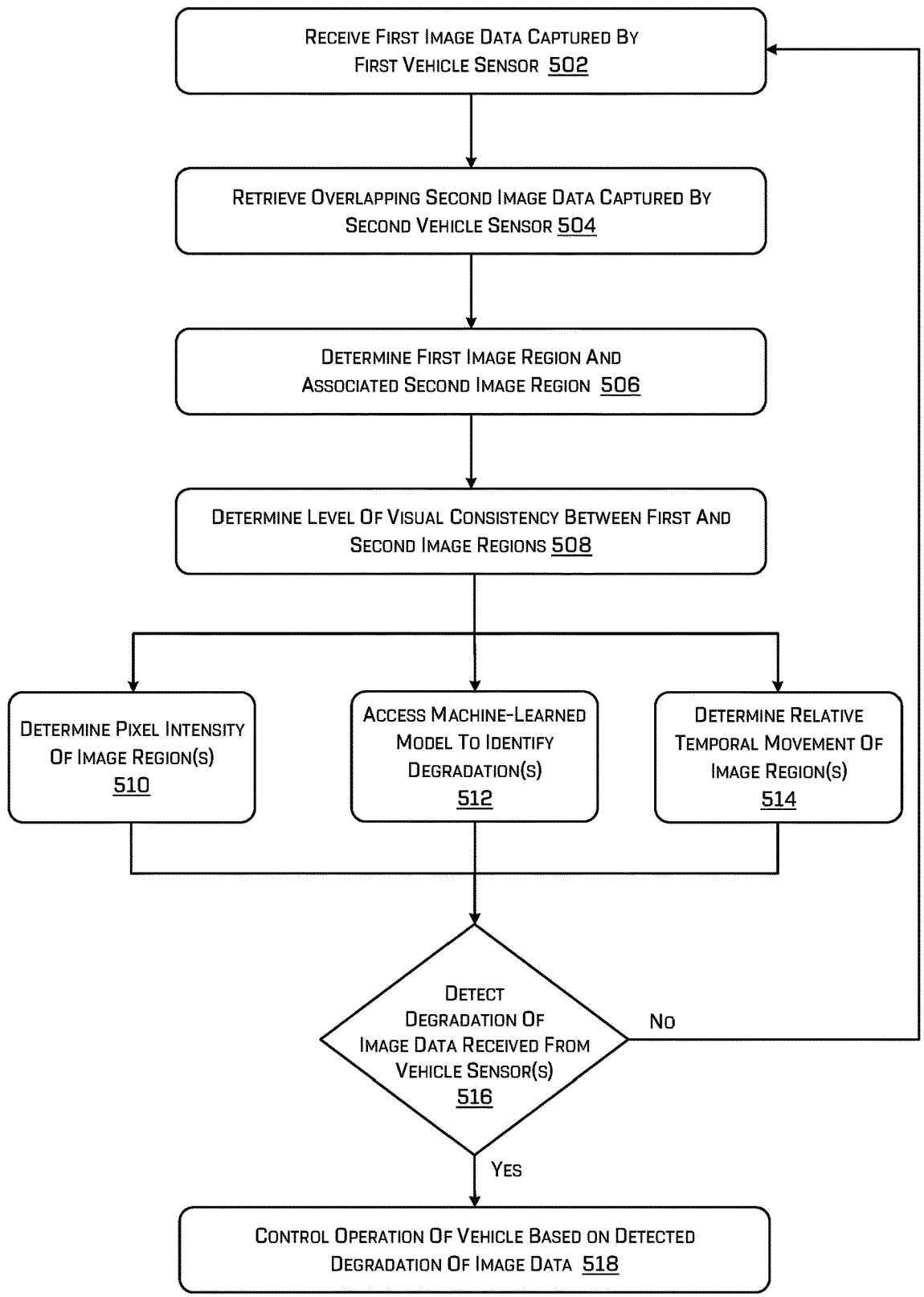
FIG. 5 illustrates a flow diagram of an example process for detecting degradations within the data captured by vehicle sensors, by performing a combination of techniques on image data received from multiple different vehicle sensors.
Figure 6:
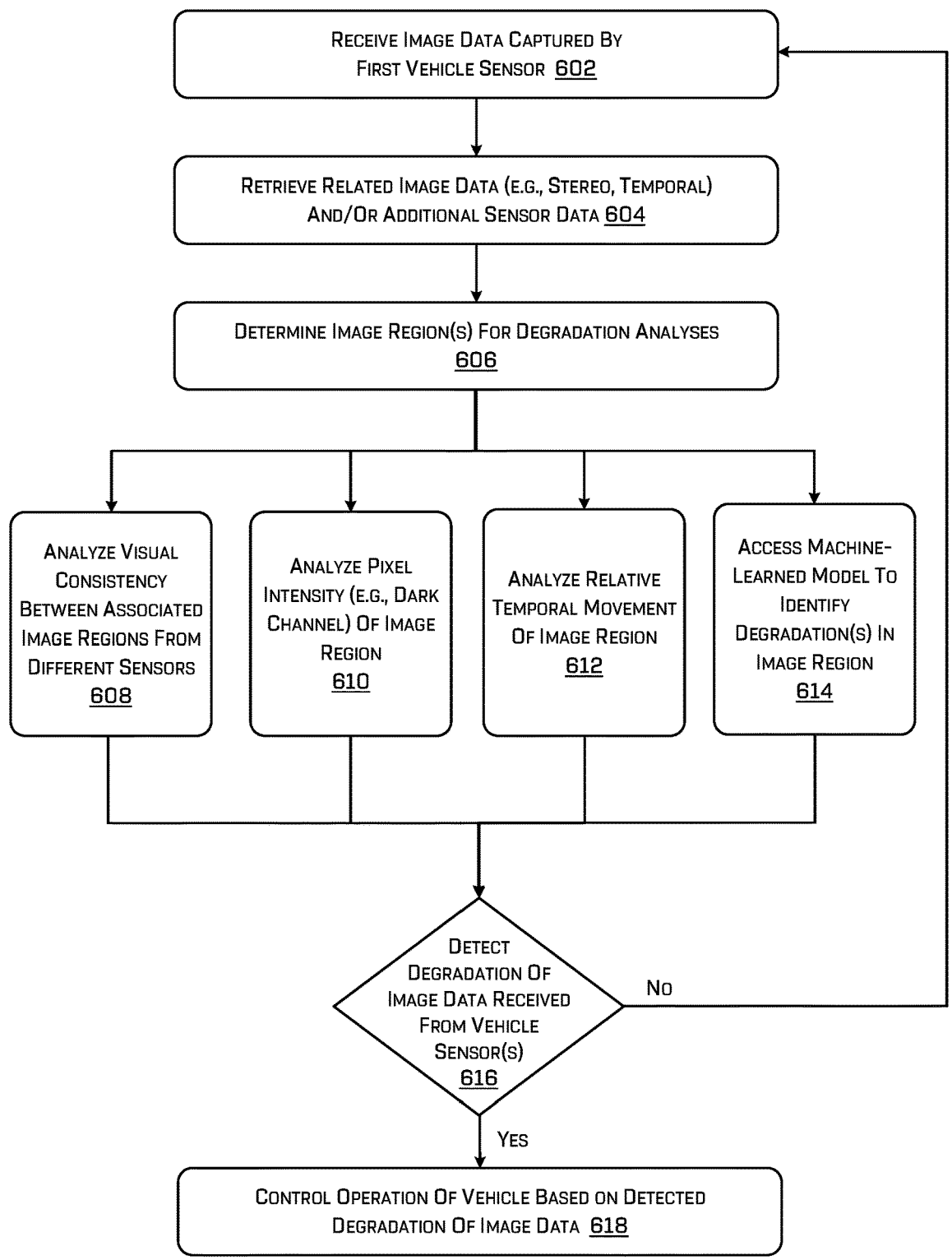
FIG. 6 illustrates a flow diagram of another example process for detecting degradations within the data captured by vehicle sensors, by performing a combination of techniques on image data received from multiple different vehicle sensors over a time period.

FIG. 5 and FIG. 6 illustrates two alternative processes for detecting degradations within the image 106 data captured by vehicle sensors 104, based on different combinations of the techniques described above.

FIG. 5 illustrates a first example process in which degradations are detected by performing a visual consistency analysis between overlapping image regions captured by separate sensors 104 described in FIG. 2, in combination with either a pixel intensity analysis of the image regions captured by a sensor 104 described in FIG. 3, a relative temporal movement analysis of image regions captured by a sensor 104 described in FIG. 4, and/or by accessing a machine-learned model trained to identify degradations in image data. At 502, first image data 106 may be captured a vehicle sensor 104. At 504, second image data 106, having an overlapping field of view with the first image data 106, may be captured a second vehicle sensor 104. At 506, the first image data and second image data may be rectified and matched to determine one or more associated (or corresponding) image regions within the first and second image data. At 508, the associated image regions within the first and second image data may be compared to determine the level of visual consistency between the image regions. Thus, 502-508 of FIG. 5 may be similar or identical to 202-208 and may be performed as described above by an image comparison component 112 operating within the degradation detection engine 110.

Continuing with FIG. 5, the example process may perform one or more of, at 510, performing a pixel intensity analysis of the first and/or second image regions, at 512, accessing one or more machine-learned models trained to recognize degradations within the first and/or second image regions, or at 514, performing a relative temporal movement analysis of the first and/or second image regions. As noted above, the pixel intensity analysis performed at 510 may be similar or identical to the pixel intensity analysis described above at 302-308, and may be performed by the pixel intensity analysis component 114, while the relative temporal movement analysis performed at 514 may be similar or identical to the relative temporal movement analysis described above at 402-408, and may be performed by the relative temporal movement analysis component 116. Additionally, accessing the machine-learned model(s) at 512 to recognize degradations within image data may include similar or identical techniques to those described above performed by the machine-learned model(s) 118. In various examples, any combination of the individual techniques in 510, 512, and 514 may be performed by a degradation detection engine 110.

At 516, the degradation detection engine 110 of the autonomous vehicle 102 may determine whether or not a degradation is affecting the image data 106 captured by one or more vehicle sensors 104. The determination at 516 may be performed based on the combination of the determination of the level of visual consistency between the image regions performed at 508, and one or more of the pixel intensity analysis performed at 510, the machined-learned model(s) accessed at 512, or the temporal movement analysis performed at 514. In some examples, the degradation detection engine 110 may determine and apply different thresholds for the different determinations at 508 510, 512, and/or 514, so that a degradation is detected only when each individual technique detects the degradation. In other examples, the degradation detection engine 110 may determine and apply a combined threshold value, in which a first data metric representing the level of visual consistency determined at 508 is combined with (e.g., summed or multiplied by) either a second data metric representing the level of pixel intensity determined at 510, a third data metric representing a confidence level of the machine-learned model(s) at 512 that a degradation has been detected, and/or a fourth data metric representing the level of relative temporal movement determined at 514.

If the degradation detection engine 110 detects a degradation in the image data 106 captured by any of vehicle sensors 104 (516:Yes), then at 518 one or more operations of the autonomous vehicle 102 may be controlled in response to the detection of the degradation. In contrast, if the degradation detection engine 110 does not detect a degradation in the image data 106 captured by the vehicle sensors 104 (516:No), then in this example the process may return to 502 to await the capture of additional image data 106 from the vehicle sensors 104.

FIG. 6 illustrates a second example process in which degradations are detected by performing a visual consistency analysis between overlapping image regions captured by separate sensors 104 described in FIG. 2, in combination with a pixel intensity analysis of the image regions captured by a sensor 104 described in FIG. 3, and a relative temporal movement analysis of image regions captured by a sensor 104 described in FIG. 4. At 602, first image data 106 may be captured a vehicle sensor 104. At 604, related image data 106 may be retrieved, including image data 106 captured from one or more different sensors 104 having overlapping fields of view with the first image data 106, and/or series of images 106 captured by the same or other vehicles sensor 104 over a period of time. At 606, the first image data received at 502 and related image data received at 504 may be analyzed (e.g., rectified and/or matched) to determine one or more associated (or corresponding) image regions between the sets of image data. As noted above, the related sets of image data may represent images 106 captured by different vehicle sensors 104 at the same or a similar point in time, and/or may represent sequence(s) of images 106 captured by the same or different vehicle sensors 104 over a period of time. At 608, the associated image regions within the image data 106 captured by different sensors 104 may be compared to determine the level of visual consistency between the image regions, which may be similar or identical to 202-208, and may be performed as described above by an image comparison component 112 operating within the degradation detection engine 110. At 610, a pixel intensity analysis of the first and/or second image regions may be performed, which may be similar or identical to the pixel intensity analysis described above at 302-308, and may be performed by the pixel intensity analysis component 114. At 612, a relative temporal movement analysis of the first and/or second image regions may be performed, which may be similar or identical to the relative temporal movement analysis described above at 402-408 and may be performed by the relative temporal movement analysis component 116. At 614, the degradation detection engine 110 may access one or more machine-learned models trained to recognize degradations within the first and/or second image regions. As discussed above, machine-learned models may be trained to detect degradations within the image data and/or to identify the particular type or source of the degradation.

At 616, the degradation detection engine 110 of the autonomous vehicle 102 may determine whether or not a degradation is affecting the image data 106 captured by one or more vehicle sensors 104. The determination at 616 may be performed based on the combination of the determination of the level of visual consistency between the image regions performed at 608, the pixel intensity analysis performed at 610, the temporal movement analysis performed at 612, and the machined-learned model accessed at 614. As discussed above, in various different examples the determination in 616 may be based solely on any of the individual techniques in 608, 610, 612, or 614, or on any combination of these or other techniques. Examples of other techniques that may be used to identify degradations of sensor data include analyzing saturation levels, exposure, contrast, or other characteristics of image data. Additionally, the degradation detection engine 110 may determine and apply different thresholds for the different determinations at 608, 610, 612, and 614, so that a degradation is detected only when one or more of the techniques detect the degradation, using predetermined threshold levels of confidence, degradation size thresholds, and/or degradation severity thresholds. In other examples, the degradation detection engine 110 may determine and apply one or more combined threshold values, in which a first data metric representing the level of visual consistency determined at 608 is combined with (e.g., summed or multiplied by) a second data metric representing the level of pixel intensity determined at 610, and/or a third data metric representing the level of relative temporal movement determined at 612, and/or a fourth data metric representing a confidence level of the machine-learned model that a degradation has been detected.

If the degradation detection engine 110 detects a degradation in the image data 106 captured by any of the vehicle sensors 104 (616:Yes), then at 618 one or more operations of the autonomous vehicle 102 may be controlled in response to the detection of the degradation. In contrast, if the degradation detection engine 110 does not detect a degradation in the image data 106 captured by the vehicle sensors 104 (616:No), then in this example the process may return to 602 to await the capture of additional image data 106 from the vehicle sensors 104.

The equation below illustrates an example embodiment in which the degradation detection techniques described above may be used in combination to determine the probability that a particular image region (e.g., a pixel or group of pixels within an image) is degraded by the presence of an optical flare. In this example, the above techniques may be used to determine quantifiable metrics for the observed stereo consistency of the image region (denoted as $SC_{ob}$), the observed optical flow of the image region (denoted as $OF_{ob}$), and the observed dark channel of the image region (denoted as $DC_{ob}$). Additionally, associated threshold values for each of the stereo consistency (denoted as $SC_{th}$), optical flow (denoted as $OF_{th}$), and dark channel (denoted as $DC_{th}$) may be determined based on analyses of the minimum and maximum values for each technique within a number of samples of optical flare image regions.

In this example, the probability that the image region is degraded by an optical flare may be defined as follows:

$$P(\text{isFlare}|SC_{ob},OF_{ob},DC_{ob}) = P(SC_{ob},OF_{ob},DC_{ob}|\text{isFlare})*P(\text{isFlare})/(P(SC_{ob},OF_{ob},DC_{ob}|\text{isFlare})*P(\text{isFlare}) + P(SC_{ob},OF_{ob},DC_{ob}|\text{NotFlare})*P(\text{NotFlare})) = P(SC_{ob}|\text{isFlare})*P(OF_{ob}|\text{isFlare})*P(DC_{ob}|\text{isFlare})/(P(SC_{ob}|\text{isFlare})*P(OF_{ob}|\text{isFlare})*P(DC_{ob}|\text{isFlare}) + P(SC_{ob},OF_{ob},DC_{ob}|\text{NotFlare})*P(\text{NotFlare})/P(\text{isFlare})) = \text{sigmoid}(SC_{ob}-SC_{th})*\text{sigmoid}(OF_{ob}-OF_{th})*\text{sigmoid}(DC_{ob}-DC_{th})/(\text{sigmoid}(SC_{ob}-SC_{th})*\text{sigmoid}(OF_{ob}-OF_{th})*\text{sigmoid}(DC_{ob}-DC_{th}) + f(\text{vehicle speed})*g(\text{sun angle})))$$

As shown in the above example, a sigmoid function may be used to estimate the conditional probabilities of optical flare and no optical flare, given the observed stereo consistency data, optical flow data, and dark channel data for the image region. Additionally, the P ($SC_{ob}$, $OF_{ob}$, $DC_{ob}$| NotFlare) may be a function of the current vehicle speed and/or sun angle with respect to the vehicle. In some cases, the f (vehicle speed) parameter may be used to implement a policy in which detection is stopped when the average observed optical flow is below a predetermined threshold. The g (sun angle) parameter need not be used, or may be expressed as a constant value if sun angle data is not available or relevant, such as for driving at night or on cloudy days.

If the output of the above equation, P (isFlare|$SC_{ob}$, $OF_{ob}$, $DC_{ob}$), is greater than a predetermined threshold the degradation detection engine 110 may determine that the image region is degraded by an optical flare, whereas if the equation output is lower than the threshold the degradation detection engine 110 may determine that the image region is not degraded by an optical flare. Additionally, although the example equation above is specific to detecting optical flares, similar equations and techniques may be used to detect other types or sources of degradations (e.g., dirt, mud, fog, raindrops, sensor errors, etc.).

Referring again to 518 and 618, when the operations of the autonomous vehicle 102 are controlled in response to the detection of the degradation in the image data 106, one or a combination of remediation operations may be performed. In some cases, an automated cleaning process may be initiated to clean a surface of the sensor 104 (e.g., a camera lens) from which the degraded image data 106 was captured. In some cases, the navigation system and/or other vehicle control systems of the autonomous vehicle 102 may be reconfigured to reduce a level of reliance on the image data received from the sensor 104 from which the degraded image data 106 was received. Additionally or alternatively, the direction of travel and/or the orientation of the vehicle 102 may be changed to remediate the effects of the detected degradation. Other examples of remediation operations that may be performed at 518 and/or 618 may include adjusting one or more operational driving parameters of the vehicle. For instance, semi- or fully-autonomous vehicles may be configured with operational driving parameters that control the vehicle speed (e.g., maximum and/or cruising speed), as well as driving parameters such as which roads/surfaces the vehicle may select, whether or not the vehicle turns right on red, whether or not the vehicle performs unprotected turns, etc. Any of these operational driving parameters may be adjusted or disabled at 518 or 618, in response to the detection of degradations of the image data.

In some examples, some remediation operations may be performed based on detection of degradation of image data using any one of the image degradation techniques, while other remediation operations may be performed based on degradation of image data using multiple of the image degradation techniques. For instance, the vehicle may initiate sensor cleaning in response to detection of degradation of image data using any one of stereo matching, dark channel, optical flow, or machine learned techniques, and may bring the vehicle to a stop in response to detection of degradation of image data using multiple of the techniques described herein. In some examples, the outputs of one or more of the techniques described herein may be input to an additional machine learned model trained to determine a potential degradation based on the outputs of the various degradation detection techniques (e.g., stereo matching, dark channel, optical flow, machine learned techniques, etc.).

In some embodiments, the remediation operation(s) performed at 518 and 618 may depend on the type or source of the detected degradation, along with various other factors that may be determined by the computing system(s) 108 of the autonomous vehicle 102 in real-time. For example, when detecting a degradation, the degradation detection engine 110 also may determine the type or source of the degradation, such as an opaque substance (e.g., dirt, mud, etc.) on a surface of a sensor 104, a translucent or light distorting substance (e.g., a water droplet) on a surface of a sensor 104, an optical flare or other lighting phenomena, or a focusing error or other malfunction of sensor 104. The determination of the type or source of the degradation may be based on the execution of various degradation detection techniques described above. For instance, the degradation detection technique of analyzing the visual consistency between overlapping image regions captured by separate sensors 104, described above in reference to FIG. 2, may be effective at identifying opaque or translucent substances on the surfaces of sensors 104, and relatively less effective at identifying optical flares or other visual phenomena. In contrast, the pixel intensity analysis technique, described above in reference to FIG. 3, may be effective at identifying translucent substances on the surfaces of sensors 104 and at identifying optical flares and other visual phenomena, but may be relatively less effective at identifying opaque substances on the surfaces of sensors 104. Finally, the relative temporal movement analysis technique, described above in reference FIG. 4, may be effective at identifying opaque substances on the surfaces of sensors 104 and identifying optical flares or other visual phenomena, but may be relatively less effective at identifying translucent substances on the surfaces of sensors 104. Thus, the techniques used to detect the degradation in the image data 106, and the results of those techniques, may provide additional technical advantages, by which the degradation detection engine 110 also may determine the particular type or source of the degradation (e.g., dirt, mud, raindrops, optical flares, fog, lens focusing errors, etc.), thus allowing an appropriate remediation function to be performed based on the type or source of the degradation.

Additionally or alternatively, other techniques may be used to determine the type or source of a detected degradation in the image data 106 captured by the vehicle sensor(s) 104. For example, as discussed above, a visual analysis of the image data 106 (e.g., a rules-based analysis and/or a trained machine-learning model) may be executed by the degradation detection engine 110 to determine the type or source of the degradation, alone or in combination with any of the techniques described above. Additionally, data from any of the other sensors 104 described herein and/or data received from one or more external data sources also may be used to identify the type or source of detected degradation. For instance, the current time of day, orientation of vehicle 102, sun angle with respect to the vehicle 102, and current weather conditions may be received and analyzed by the degradation detection engine 110 to determine that an optical flare is a likely cause of a detected degradation. As another example, the current weather conditions, road surface and conditions, traffic conditions, and vehicle speed may be analyzed in conjunction with the image data 106 to determine that dirt, mud, and/or a water droplet is a likely cause of a detected degradation.

In some embodiments, the vehicle control system 120 may select the remediation options based on the source or type of the degradation. For instance, if the degradation detection engine 110 determines that the cause of the degradation is an opaque or translucent substance (e.g., dirt, mud, a raindrop, etc.) on a surface of the sensor 104, then the vehicle control system 120 may initiate an automated cleaning process on the degraded surface in response. In contrast, if the degradation detection engine 110 determines that the cause of a degradation is an optical flare or other lighting phenomena, then an automated cleaning process of the sensor is not likely to remedy the degradation and a different remediation operation (e.g., reducing reliance on the image data 106) may be initiated.

In some examples, the vehicle control system 120 may use additional data factors and further analyses to determine if and when a remediation operation will be performed in response to a detected degradation, as well as which remediation operation(s) will be performed. For instance, degradation detection engine 110 and/or the vehicle control system 120 may determine and analyze the severity of degradation (e.g., what portion of the image data 106 is degraded), the location of the degradation within the image data 106 (e.g., center versus corner of captured images 106), for how long the image data 106 from the sensor 104 has been degraded (e.g., a time threshold may be used before a remediation operation is performed), and/or whether one or more other vehicle sensors 104 are available to capture the degraded portion of the image data 106 (e.g., cameras or other sensors 104 with overlapping fields of view). Based on any of these factors, alone or in combination, the vehicle control system 120 may determine whether a detected degradation will trigger a remediation operation, when the remediation operation will be performed, and which remediation operation(s) will be performed to address the degradation.

Figure 7A:
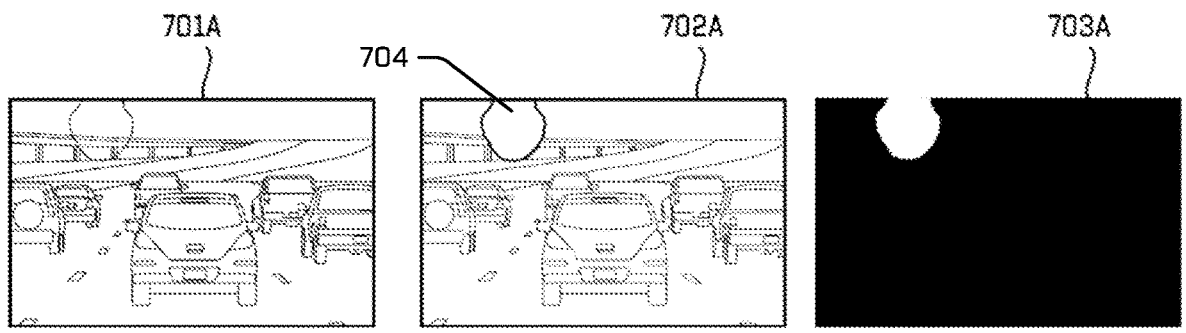
FIGS. 7A-7C depict example images captured by vehicle sensors, along with example images generated during degradation detection techniques described herein.
Figure 7B:
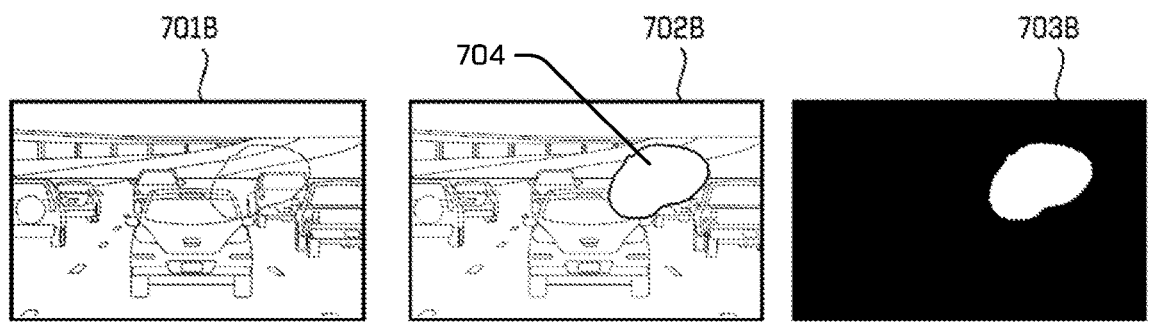
Figure 7C:
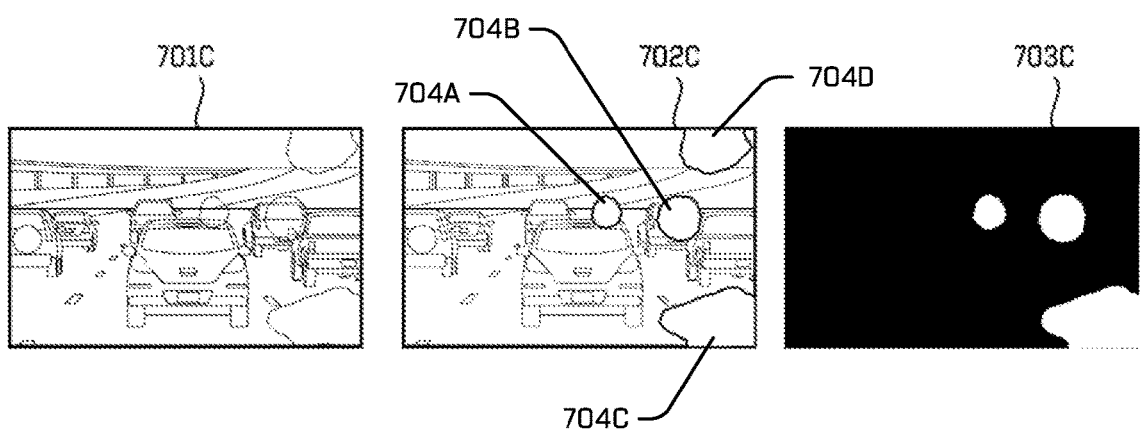

FIGS. 7A-7C depict three sets of example image data captured by vehicle sensors 104, along with example modified sets of images that may be generated during degradation detection techniques described herein. Specifically, each set of images shown in FIGS. 7A, 7B, and 7C includes a first example image captured by a vehicle sensor 104, a second image illustrating one or more of the degradation detection techniques described herein, and a third image illustrating an output from one or more of the degradation detection techniques described herein. With respect to images 701a, 701b, and 701c (collectively "images 701"), image 701a is an example image captured by a vehicle sensor 104 (e.g., a camera) in which the image is partially degraded by a raindrop on the lens surface of the sensor, while example images 701b and 701c are partially degraded by optical flare(s).

Intermediate images 702a, 702b, and 702c (collectively "images 702") illustrate examples of the techniques described above for detecting degradations within image data in which regions of potential degradation 704 are indicated by the outlined shapes. The regions of potential degradation 704 may be associated with a probability that there is a degradation at the particular region. The probabilities may be based on the outputs of the one or more degradation detection techniques applied. The probabilities may be represented as probability distributions or heat maps. In the example of FIG. 7C, four regions of potential degradation are shown, including a first region of potential degradation 704a having a first probability, a second region of potential degradation 704b having a second probability, a third region of potential degradation 704c having a third probability, and a fourth region of potential degradation 704d having a fourth probability. The probabilities may be used in determining whether or not a potential region of degradation represents an occlusion or not. For instance, if the probability that there is a degradation at the particular location is at or above a threshold probability, the region may be determined to be degraded. If the probability is below the threshold then the region will be determined not to be degraded.

Finally, images 703a, 703b, and 703c (collectively "images 703") may represent an output of the degradation detection techniques described herein. In images 703, the portions of each image depicted in white represent regions determined to be degraded, while the non-degraded portions of each image are depicted in black. In the example illustrated in FIG. 7C, the first region of potential degradation 704a, the second region of potential degradation 704b, and the third region of potential degradation 704c have probabilities above the threshold probability and are therefore represented in the output image 703c as degraded regions shown in white. Potential degraded region 704d in this example has a probability below the threshold (e.g., is determent not to be degraded) and is therefore not represent in the output image 703c.

As noted above, the vehicle control system 120 may determine whether a detected degradation will trigger a remediation operation, when a remediation operation will be performed, and/or which remediation operation(s) will be performed to address the detected degradation. In some embodiments, some or all of these determinations may be based on the images 703. For example, the representations of degraded and non-degraded portions in images 703 may be used to determine the severity of degradation (e.g., how much of image 703 is degraded and how much is usable), the location of the degradation within the image data 703 (e.g., center versus corner, lower versus upper, etc.), and/or whether any other sensors 104 are available to capture the degraded portion of the image 703 (e.g., cameras or other sensors 104 with fields of view covering the degraded portions). Thus, the degradation detection engine 110 and/or vehicle control system 120 may analyze the output images 703 to determine if, when, and which remediation operation(s) may be performed in response to the degradations represented by the images 703.

Example Clauses

Any of the example clauses in this section may be used with any other of the example clauses and/or any of the other examples or embodiments described herein.

A: A vehicle comprising: one or more processors; a first sensor to capture sensor data of an environment of the vehicle; a second sensor to capture sensor data of the environment of the vehicle, the second sensor having a field of view that at least partially overlaps with a field of view of the first sensor; and non-transitory computer-readable media storing instructions that when executed by the one or more processors, cause the vehicle to perform operations comprising: receiving first image data captured by the first sensor at a first time; identifying a first image region within the first image data; retrieving second image data captured by the second sensor; identifying a second image region within the second image data associated with the first image region; determining a level of visual consistency between the first image region and the second image region; detecting a degradation of the first image data captured by the first sensor, based on a combination of the determined level of visual consistency and at least one of: an intensity associated with the first image region; a measurement of temporal movement associated with the first image region, based on third image data captured at a second time different from the first time; or an output from a machine learned model trained to detect degradations based on image data; and controlling an operation of the vehicle based at least in part on the detection of the degradation.

B: A vehicle as paragraph A describes, wherein detecting the degradation of the first image data comprises identifying a source or type of the degradation, wherein the identified source or type of the degradation comprises at least one of: an opaque substance on a surface of the first sensor; a drop of water on a surface of the first sensor; an optical flare within a detection field of the first sensor; or a visual focusing error of the first sensor.

C: A vehicle as paragraphs A or B describe, wherein controlling the operation of the vehicle based at least in part on the detection of the degradation of the first image data comprises at least one of: initiating cleaning of a surface of the first sensor; reducing a level of reliance on data received from the first sensor; changing a direction of travel of the vehicle; or adjusting one or more operational driving parameters of the vehicle.

D: A vehicle as any one of paragraphs A-C describe, wherein detecting the degradation of the first image data is based on: the determined level of visual consistency between the first image region and the second image region; the intensity associated with the first image region; and the measurement of temporal movement associated with the first image region.

E: A vehicle as any one of paragraphs A-D describe, wherein detecting the degradation further comprises: inputting, into the machine learned model, the first image data; and receiving the output from the machine learned model, wherein the output is based at least in part on the first image data, and wherein the output indicates the degradation of the first image data captured by the first sensor.

F: A method comprising: receiving first image data captured by a first sensor of a vehicle at a first time; identifying a first image region within the first image data; detecting a degradation of the first image data captured by the first sensor, wherein said detecting is based on at least two of: a determined level of visual consistency between the first image region and a corresponding second image region within second image data captured by a second sensor; an intensity associated with the first image region; a measurement of temporal movement associated with the first image region based on third image data captured at a second time different from the first time; an output from a machine learned model trained to detect degradations based on image data; and controlling an operation of the vehicle based at least in part on the detection of the degradation.

G: A method as paragraph F describes: wherein detecting the degradation of the first image data comprises: determining a first probability of the degradation of the first image data, the first probability based on the level of visual consistency; and determining a second probability of the degradation of the first image data, the second probability based on at least one of the intensity associated with the first image region, the measurement of temporal movement associated with the first image region, or the output from a machine learned model; calculating a third probability of the degradation of the first image data, based at least on the first probability and the second probability; and comparing the third probability of the degradation to a probability threshold.

H: A method as paragraphs F or G describe, wherein detecting the degradation of the first image data is based at least in part on the determined level of visual consistency between the first image region and the second image region, and wherein the method further comprises: determining that the second sensor has an overlapping detection field with the first sensor; retrieving the second image data captured by the second sensor; identifying the second image region within the second image data associated with the first image region; and determining the level of visual consistency between the first image region and the second image region.

I: A method as any one of paragraphs F-H describe, wherein detecting the degradation of the first image data is based at least in part on the intensity associated with the first image region, and wherein the method further comprises: determining a dark channel value associated with the first image data, based at least in part on intensity values associated with multiple image channels of the first image data; generating an average dark channel image value based at least in part on intensity values of multiple image frames captured over time; determining a threshold based on the average dark channel image value; comparing the intensity associated with first image region to the threshold; and detecting the degradation of the first image data based at least in part on determining that that the intensity associated with first image region is greater than the threshold.

J: A method as any one of paragraphs F-I describe, wherein detecting the degradation of the first image data is based at least in part on the measurement of temporal movement associated with the first image region, and wherein the method further comprises: receiving the third image data captured by the first sensor at the second time different from the first time; and using the first image data and the third image data captured by the first sensor, determining a temporal movement of the first image region, by comparing the first image region in the first image data to the first image region in the third image data.

K: A method as paragraphs F-J describe, wherein detecting the degradation of the first image data further comprises: inputting, into the machine learned model, at least the first image data; and receiving the output from the machine learned model, wherein the output is based at least in part on the first image data, and wherein the output indicates the degradation of the first image data captured by the first sensor.

L: A method as any one of paragraphs F-K describe, wherein detecting the degradation of the first image data comprises identifying a source or type of the degradation, wherein the identified source or type of the degradation comprises at least one of: an opaque substance on a surface of the first sensor; a drop of water on a surface of the first sensor; an optical flare within a detection field of the first sensor; or a visual focusing error of the first sensor.

M: A method as any one of paragraphs F-L describe, wherein controlling the operation of the vehicle based at least in part on the detection of the degradation of the first image data comprises at least one of: initiating cleaning of a surface of the first sensor; reducing a level of reliance on data received from the first sensor; changing a direction of travel of the vehicle; or adjusting one or more operational driving parameters of the vehicle.

N: A non-transitory computer-readable medium storing processor-executable instructions that, when executed by one or more processors, cause the one or more processors to perform operations comprising: receiving first image data captured by a first sensor of a vehicle at a first time; identifying a first image region within the first image data; and detecting a degradation of the first image data captured by the first sensor, and wherein said detecting is based on at least two of: a determined level of visual consistency between the first image region and an associated second image region within second image data captured by a second sensor; an intensity associated with the first image region; a measurement of temporal movement associated with the first image region based on third image data captured at a second time different from the first time; an output from a machine learned model trained to detect degradations based on image data; and controlling an operation of the vehicle based at least in part on the detecting of the degradation.

O: A non-transitory computer-readable medium non-transitory computer-readable medium as paragraph N describes, wherein detecting the degradation of the first image data comprises: determining a first probability of the degradation of the first image data, the first probability based on the level of visual consistency; and determining a second probability of the degradation of the first image data, the second probability based on at least one of the intensity associated with the first image region, the measurement of temporal movement associated with the first image region, or the output from a machine learned model; calculating a third probability of the degradation of the first image data, based at least on the first probability and the second probability; and comparing the third probability of the degradation to a probability threshold.

P: A non-transitory computer-readable medium non-transitory computer-readable medium as paragraphs N or O describe, wherein detecting the degradation of the first image data is based at least in part on the determined level of visual consistency between the first image region and the second image region, and wherein the operations further comprise: determining that the second sensor has an overlapping detection field with the first sensor; retrieving the second image data captured by the second sensor; identifying the second image region within the second image data associated with the first image region; and determining the level of visual consistency between the first image region and the second image region.

Q. A non-transitory computer-readable medium non-transitory computer-readable medium as any one of paragraphs N-P describe, wherein detecting the degradation of the first image data is based at least in part on the intensity associated with the first image region, and wherein the operations further comprise: determining a dark channel value associated with the first image data, based at least in part on intensity values associated with multiple image channels of the first image data; generating an average dark channel image value based at least in part on intensity values of multiple image frames captured over time; determining a threshold based on the average dark channel image value; comparing the intensity associated with first image region to the threshold; and detecting the degradation of the first image data based at least in part on determining that that the intensity associated with first image region is greater than the threshold.

R. A non-transitory computer-readable medium non-transitory computer-readable medium as any one of paragraphs N-Q describe, wherein detecting the degradation of the first image data is based at least in part on the measurement of temporal movement associated with the first image region, and wherein the operations further comprise: receiving the third image data captured by the first sensor at the second time different from the first time; and using the first image data and the third image data captured by the first sensor, determining a temporal movement of the first image region, by comparing the first image region in the first image data to the first image region in the third image data.

S. A non-transitory computer-readable medium non-transitory computer-readable medium as any one of paragraphs N-R describe, wherein detecting the degradation of the first image data captured by the first sensor further comprises: inputting, into the machine learned model, at least the first image data; and receiving the output from the machine learned model, wherein the output is based at least in part on the first image data, and wherein the output indicates the degradation of the first image data captured by the first sensor.

T. A non-transitory computer-readable medium non-transitory computer-readable medium as any one of paragraphs N-S describe, wherein controlling the operation of the vehicle based at least in part on the detection of the degradation of the first image data comprises at least one of: initiating cleaning of a surface of the first sensor; reducing a level of reliance on data received from the first sensor; changing a direction of travel of the vehicle; or adjusting one or more operational driving parameters of the vehicle.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle comprising:
   one or more processors;
   a first sensor to capture sensor data of an environment of the vehicle;
   a second sensor to capture sensor data of the environment of the vehicle, the second sensor having a field of view that at least partially overlaps with a field of view of the first sensor; and
   non-transitory computer-readable media storing instructions that when executed by the one or more processors, cause the vehicle to perform operations comprising:
      receiving first image data captured by the first sensor at a first time;
      identifying a first image region within the first image data;
      retrieving second image data captured by the second sensor;
      identifying a second image region within the second image data associated with the first image region;
      determining a level of visual consistency between the first image region and the second image region;
      detecting a degradation of the first image data captured by the first sensor, based on a combination of the determined level of visual consistency and at least one of:
         an intensity associated with the first image region;
         a measurement of temporal movement associated with the first image region, based on third image data captured at a second time different from the first time; or
         an output from a machine learned model trained to detect degradations based on image data; and
      controlling an operation of the vehicle based at least in part on the detection of the degradation,
      wherein detecting the degradation further comprises:
         inputting, into the machine learned model, the first image data; and
         receiving the output from the machine learned model, wherein the output is based at least in part on the first image data, and wherein the output indicates the degradation of the first image data captured by the first sensor.

2. The vehicle of claim 1, wherein detecting the degradation of the first image data comprises identifying a source or type of the degradation, wherein the identified source or type of the degradation comprises at least one of:
   an opaque substance on a surface of the first sensor;
   a drop of water on a surface of the first sensor;
   an optical flare within a detection field of the first sensor; or
   a visual focusing error of the first sensor.

3. The vehicle of claim 1, wherein controlling the operation of the vehicle based at least in part on the detection of the degradation of the first image data comprises at least one of:
   initiating cleaning of a surface of the first sensor;
   reducing a level of reliance on data received from the first sensor;
   changing a direction of travel of the vehicle; or
   adjusting one or more operational driving parameters of the vehicle.

4. The vehicle of claim 1, wherein detecting the degradation of the first image data is based on:
   the determined level of visual consistency between the first image region and the second image region;
   the intensity associated with the first image region; and
   the measurement of temporal movement associated with the first image region.

5. A method comprising:
   receiving first image data captured by a first sensor of a vehicle at a first time;
   identifying a first image region within the first image data;
   detecting a degradation of the first image data captured by the first sensor, wherein said detecting is based on at least two of:
      a determined level of visual consistency between the first image region and a corresponding second image region within second image data captured by a second sensor;
      an intensity associated with the first image region;
      a measurement of temporal movement associated with the first image region based on third image data captured at a second time different from the first time;

an output from a machine learned model trained to detect degradations based on image data; and
controlling an operation of the vehicle based at least in part on the detection of the degradation.

6. The method of claim 5, wherein detecting the degradation of the first image data comprises:
determining a first probability of the degradation of the first image data, the first probability based on the level of visual consistency; and
determining a second probability of the degradation of the first image data, the second probability based on at least one of the intensity associated with the first image region, the measurement of temporal movement associated with the first image region, or the output from a machine learned model;
calculating a third probability of the degradation of the first image data, based at least on the first probability and the second probability; and
comparing the third probability of the degradation to a probability threshold.

7. The method of claim 5, wherein detecting the degradation of the first image data is based at least in part on the determined level of visual consistency between the first image region and the second image region, and wherein the method further comprises:
determining that the second sensor has an overlapping detection field with the first sensor;
retrieving the second image data captured by the second sensor;
identifying the second image region within the second image data associated with the first image region; and
determining the level of visual consistency between the first image region and the second image region.

8. The method of claim 5, wherein detecting the degradation of the first image data is based at least in part on the intensity associated with the first image region, and wherein the method further comprises:
determining a dark channel value associated with the first image data, based at least in part on intensity values associated with multiple image channels of the first image data;
generating an average dark channel image value based at least in part on intensity values of multiple image frames captured over time;
determining a threshold based on the average dark channel image value;
comparing the intensity associated with first image region to the threshold; and
detecting the degradation of the first image data based at least in part on determining that that the intensity associated with first image region is greater than the threshold.

9. The method of claim 5, wherein detecting the degradation of the first image data is based at least in part on the measurement of temporal movement associated with the first image region, and wherein the method further comprises:
receiving the third image data captured by the first sensor at the second time different from the first time; and
using the first image data and the third image data captured by the first sensor, determining a temporal movement of the first image region, by comparing the first image region in the first image data to the first image region in the third image data.

10. The method of claim 5, wherein detecting the degradation of the first image data further comprises:
inputting, into the machine learned model, at least the first image data; and
receiving the output from the machine learned model, wherein the output is based at least in part on the first image data, and wherein the output indicates the degradation of the first image data captured by the first sensor.

11. The method of claim 5, wherein detecting the degradation of the first image data comprises identifying a source or type of the degradation, wherein the identified source or type of the degradation comprises at least one of:
an opaque substance on a surface of the first sensor;
a drop of water on a surface of the first sensor;
an optical flare within a detection field of the first sensor; or
a visual focusing error of the first sensor.

12. The method of claim 5, herein controlling the operation of the vehicle based at least in part on the detection of the degradation of the first image data comprises at least one of:
initiating cleaning of a surface of the first sensor;
reducing a level of reliance on data received from the first sensor;
changing a direction of travel of the vehicle; or
adjusting one or more operational driving parameters of the vehicle.

13. A non-transitory computer-readable medium storing processor-executable instructions that, when executed by one or more processors, cause the one or more processors to perform operations comprising:
receiving first image data captured by a first sensor of a vehicle at a first time;
identifying a first image region within the first image data; and
detecting a degradation of the first image data captured by the first sensor, and wherein said detecting is based on at least two of:
a determined level of visual consistency between the first image region and an associated second image region within second image data captured by a second sensor;
an intensity associated with the first image region;
a measurement of temporal movement associated with the first image region based on third image data captured at a second time different from the first time;
an output from a machine learned model trained to detect degradations based on image data; and
controlling an operation of the vehicle based at least in part on the detecting of the degradation.

14. The non-transitory computer-readable medium of claim 13, wherein detecting the degradation of the first image data comprises:
determining a first probability of the degradation of the first image data, the first probability based on the level of visual consistency; and
determining a second probability of the degradation of the first image data, the second probability based on at least one of the intensity associated with the first image region, the measurement of temporal movement associated with the first image region, or the output from a machine learned model;
calculating a third probability of the degradation of the first image data, based at least on the first probability and the second probability; and
comparing the third probability of the degradation to a probability threshold.

15. The non-transitory computer-readable medium of claim 13, wherein detecting the degradation of the first image data is based at least in part on the determined level of visual consistency between the first image region and the second image region, and wherein the operations further comprise:
  determining that the second sensor has an overlapping detection field with the first sensor;
  retrieving the second image data captured by the second sensor;
  identifying the second image region within the second image data associated with the first image region; and
  determining the level of visual consistency between the first image region and the second image region.

16. The non-transitory computer-readable medium of claim 13, wherein detecting the degradation of the first image data is based at least in part on the intensity associated with the first image region, and wherein the operations further comprise:
  determining a dark channel value associated with the first image data, based at least in part on intensity values associated with multiple image channels of the first image data;
  generating an average dark channel image value based at least in part on intensity values of multiple image frames captured over time;
  determining a threshold based on the average dark channel image value;
  comparing the intensity associated with first image region to the threshold; and
  detecting the degradation of the first image data based at least in part on determining that that the intensity associated with first image region is greater than the threshold.

17. The non-transitory computer-readable medium of claim 13, wherein detecting the degradation of the first image data is based at least in part on the measurement of temporal movement associated with the first image region, and wherein the operations further comprise:
  receiving the third image data captured by the first sensor at the second time different from the first time; and
  using the first image data and the third image data captured by the first sensor, determining a temporal movement of the first image region, by comparing the first image region in the first image data to the first image region in the third image data.

18. The non-transitory computer-readable medium of claim 13, wherein detecting the degradation of the first image data captured by the first sensor further comprises:
  inputting, into the machine learned model, at least the first image data; and
  receiving the output from the machine learned model, wherein the output is based at least in part on the first image data, and wherein the output indicates the degradation of the first image data captured by the first sensor.

19. The non-transitory computer-readable medium of claim 13, wherein controlling the operation of the vehicle based at least in part on the detection of the degradation of the first image data comprises at least one of:
  initiating cleaning of a surface of the first sensor;
  reducing a level of reliance on data received from the first sensor;
  changing a direction of travel of the vehicle; or
  adjusting one or more operational driving parameters of the vehicle.

* * * * *

UNITED STATES PATENT AND TRADEMARK OFFICE
CERTIFICATE OF CORRECTION

PATENT NO. : 11,120,538 B2
APPLICATION NO. : 16/728532
DATED : September 14, 2021
INVENTOR(S) : Sarah Tariq et al.

Page 1 of 1

It is certified that error appears in the above-identified patent and that said Letters Patent is hereby corrected as shown below:

In the Claims

Column 32, Line 15, in Claim 12, change "herein" to -- wherein --.

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*